US011828657B2

(12) United States Patent
Ranganathan

(10) Patent No.: US 11,828,657 B2
(45) Date of Patent: Nov. 28, 2023

(54) SURFACE TEMPERATURE ESTIMATION FOR BUILDING ENERGY AUDITS

(71) Applicant: University of North Dakota, Grand Forks, ND (US)

(72) Inventor: Prakash Ranganathan, Grand Forks, ND (US)

(73) Assignee: University of North Dakota, Grand Forks, ND (US)

(*) Notice: Subject to any disclaimer, the term of this patent is extended or adjusted under 35 U.S.C. 154(b) by 0 days.

(21) Appl. No.: 17/563,979

(22) Filed: Dec. 28, 2021

(65) Prior Publication Data

US 2023/0204424 A1  Jun. 29, 2023

(51) Int. Cl.
*G01J 5/00* (2022.01)
*G06V 20/17* (2022.01)
(Continued)

(52) U.S. Cl.
CPC .......... *G01J 5/0066* (2013.01); *B64C 39/024* (2013.01); *G06T 7/11* (2017.01); *G06T 7/136* (2017.01);
(Continued)

(58) Field of Classification Search
CPC ... G01J 5/0066; G01J 2005/0077; G06T 7/11; G06T 7/60; G06T 2207/10032;
(Continued)

(56) References Cited

U.S. PATENT DOCUMENTS 11,346,938 B2 * 5/2022 Fleming ................ G01S 13/825
2004/0239494 A1 * 12/2004 Kennedy ................ G06Q 30/02
340/500

(Continued)

FOREIGN PATENT DOCUMENTS

CN 113533418 A * 10/2021
CN 115438472 A * 12/2022
(Continued)

OTHER PUBLICATIONS

Arjoune Y, Peri S, Sugunaraj N, Biswas A, Sadhukhan D, Ranganathan P. An Instance Segmentation and Clustering Model for Energy Audit Assessments in Built Environments: A Multi-Stage Approach. Sensors (Basel). Jun. 26, 2021;21(13):4375. doi: 10.3390/s21134375. PMID: 34206718; PMCID: PMC8271532. (Year: 2021).*
(Continued)

*Primary Examiner* — Michael Robert Cammarata
(74) *Attorney, Agent, or Firm* — Schwegman Lundberg & Woessner, P.A.

(57) ABSTRACT

The present subject matter provides various technical solutions to technical problems facing automated solutions in building energy audit applications. These solutions leverage heat loss quantification to improve a building's thermal performance and improve or optimize its energy usage. The technical solutions described herein provide various advantages. These solutions include application of deep-learning methods to segment large thermal imagery data sets from a drone. The technical solutions described herein provide improved building thermal efficiency determination using multiple stages of computations to quantify the heat loss for a building envelope.

18 Claims, 10 Drawing Sheets

(51) Int. Cl.
| | |
|---|---|
| *G06T 7/11* | (2017.01) |
| *B64C 39/02* | (2023.01) |
| *G06V 20/10* | (2022.01) |
| *G06T 7/60* | (2017.01) |
| *G06V 10/762* | (2022.01) |
| *G06T 7/136* | (2017.01) |
| *B64U 101/30* | (2023.01) |

(52) U.S. Cl.
CPC .............. *G06T 7/60* (2013.01); *G06V 10/763* (2022.01); *G06V 20/17* (2022.01); *G06V 20/176* (2022.01); *B64U 2101/30* (2023.01); *G01J 2005/0077* (2013.01); *G06T 2207/10032* (2013.01); *G06T 2207/10048* (2013.01)

(58) Field of Classification Search
CPC ........ G06T 2207/10048; G06V 10/763; G06V 20/176; B64C 39/024; B64U 2101/30
See application file for complete search history.

(56) References Cited

U.S. PATENT DOCUMENTS

| | | | |
|---|---|---|---|
| 2007/0041422 A1* | 2/2007 | Shepard | G06T 7/001 |
| | | | 382/141 |
| 2016/0284075 A1 | 9/2016 | Phan et al. | |
| 2017/0038279 A1 | 2/2017 | Dasgupta et al. | |
| 2022/0326063 A1* | 10/2022 | Bertini | G01F 23/246 |
| 2022/0351486 A1* | 11/2022 | Sato | G06V 20/70 |
| 2023/0192330 A1* | 6/2023 | Shah | G01K 1/024 |
| | | | 73/865.8 |

FOREIGN PATENT DOCUMENTS

| | | |
|---|---|---|
| DE | 102018210928 B3 * | 12/2019 |
| JP | 2020154627 A * | 9/2020 |

OTHER PUBLICATIONS

Y. Arjoune et al., "Thermal Imagery Based Instance Segmentation for Energy Audit Applications in Buildings," 2019 IEEE International Conference on Big Data (Big Data), Los Angeles, CA, USA, 2019, pp. 5974-5976, doi: 10.1109/BigData47090.2019.9006077. (Year: 2019).*

J. R. M. -D. Dios and A. Ollero, "Automatic Detection of Windows Thermal Heat Losses in Buildings Using UAVs," 2006 World Automation Congress, Budapest, Hungary, 2006, pp. 1-6, doi: 10.1109/WAC.2006.375998. (Year: 2006).*

E. Lucchi, "Applications of the infrared thermography in the energy audit of buildings: A review", Renewable and Sustainable Energy Reviews, vol. 82, pp. 3077-3090, 2018. (Year: 2018).*

Marino Beatriz M. Marino, Natalia Muñoz, Luis P. Thomas, Estimation of the surface thermal resistances and heat loss by conduction using thermography, Applied Thermal Engineering, vol. 114, 2017, pp. 1213-1221, ISSN 1359-4311, (Year: 2017).*

Koiner, Katelyn, et al. "Heat loss estimation using UAS thermal imagery." 2019 IEEE International Conference on Electro Information Technology (EIT). IEEE, 2019. (Year: 2019).*

Tejedor, Blanca, et al. "Quantitative internal infrared thermography for determining in-situ thermal behaviour of façades." Energy and Buildings 151 (2017): 187-197. (Year: 2017).*

Sadhukhan,. and Ranganathan, P., 2020. Estimating surface temperature from thermal imagery of buildings for accurate thermal transmittance (U-value): A machine learning perspective. Journal of Building Engineering, 32, p. 101637, available online Aug. 12, 2020. (Year: 2020).*

Kato, Shinsuke, Katsuichi Kuroki, and Shinji Hagihara. "Method of in-situ measurement of thermal insulation performance of building elements using infrared camera." 6th International Conference on Indoor Air Quality, Ventilation & Energy Conservation in Buildings—IAQVEC. vol. 2007. Citeseer, 2007. (Year: 2007).*

Dall'O', G.; Sarto, L.; Panza, A. Infrared Screening of Residential Buildings for Energy Audit Purposes: Results of a Field Test. Energies 2013, 6, 3859-3878. https://doi.org/10.3390/en6083859 (Year: 2013).*

Arthur, D., et al., "k-means++: The advantages of careful seeding", Stanford, Tech. Rep., 2006., (Jan. 2007), 9 pgs.

Aznar, F., et al., "Modelling the thermal behaviour of a building facade using deep learning", PloS one, vol. 13, No. 12, p. e0207616, 2018., (Dec. 21, 2018), 20 pgs.

Candanedo, L.M., et al., "Data driven prediction models of energy use of appliances in a low-energy house", Energy and buildings, vol. 140, pp. 81-97, 2017., (Jan. 31, 2017), 17 pgs.

Chen, L., et al., "Deeplab: Semantic image segmentation with deep convolutional nets, atrous convolution, and fully connected crfs", IEEE Transactions on Pattern Analysis and Machine Intelligence, vol. 40, No. 4, pp. 834-848, 2018., (May 2017), 14 pgs.

Chen, L.C., et al., "Rethinking atrous convolution for semantic image segmentation", arXiv preprint arXiv:1706.05587, 2017., (Dec. 2017), 14 pgs.

Davies, D.L., et al., "A cluster separation measure", IEEE Transactions on Pattern Analysis and Machine Intelligence, vol. PAMI-1, No. 2, pp. 224-227, 1979., (May 1979), 5 pgs.

Girshick, R., et al., "Fast r-cnn", In Proceedings of the IEEE international conference on computer vision, 2015, pp. 1440-1448., (Sep. 27, 2015), 9 pgs.

Gupta, A.K., "Time portability evaluation of rcnn technique of od object detection - machine learning (artificial intelligence", International Conference on Energy, Communication, Data Analytics and Soft Computing (ICECDS), 2017, pp. 3127-3133., (2017), 7 pgs.

Hajela, G., et al., "A clustering based hotspot identification approach for crime prediction", Procedia Computer Science, vol. 167, pp. 1462-1470, 2020., (2020), 9 pgs.

He, K., et al., "Mask r-cnn", Proceedings of the IEEE international conference on computer vision, 2017, pp. 2961-2969., (Jan. 24, 2018), 12 pgs.

Hoang, V., et al., "Realtime multi-person pose estimation with rcnn and depthwise separable convolution", RIVF International Conference on Computing and Communication Technologies (RIVF), 2020, pp. 1-5., (Oct. 2020), 5 pgs.

Jaishri, W., et al., "An innovative method of acquiring optimization for image retrieval via dual clustering method based on segmentation", 2016 3rd International Conference on Computing for Sustainable Global Development (INDIACom). IEEE, 2016, pp. 436-440., (2016), 6 pgs.

Kirillov, A., et al., "Panoptic segmentation", Proceedings of the IEEE Conference on Computer Vision and Pattern Recognition, 2019, pp. 9404-9413., (Apr. 2019), 10 pgs.

Kodinariya, T.M., et al., "Review on determining No. of cluster in k-means clustering", International Journal, vol. 1, No. 6, pp. 90-95, 2013., (Nov. 2013), 7 pgs.

Kumar, D., et al., "Intuitionistic fuzzy clustering method with spatial information for mri image segmentation", IEEE International Conference on Fuzzy Systems (FUZZ-IEEE). IEEE, 2019, pp. 1-7., (2019), 7 pgs.

Lecun, Y., et al., "Deep learning", Nature vol. 521, pp. 436-444, 2015., (May 2015), 10 pgs.

Liu, W., et al., "Parsenet: Looking wider to see better", arXiv preprint arXiv:1506.04579, 2015., (Nov. 2015), 11 pgs.

Long, J., et al., "Fully convolutional networks for semantic segmentation", Proceedings of the IEEE conference on computer vision and pattern recognition, 2015, pp. 3431-3440., (Mar. 2015), 10 pgs.

Madding, R., "Finding r-values of stud frame constructed houses with ir thermography", Proc., InfraMation 2008, pp. 261-277, 2008., (2008), 19 pgs.

Marshall, A., et al., "Variations in the u value measurement of a whole dwelling using infrared thermography under controlled conditions", Buildings, vol. 8, No. 3, p. 46, 2018., (Mar. 2018), 18 pgs.

Melnykov, V., et al., "Clustering large datasets by merging k-means solutions", Journal of Classification, pp. 1-27, 2019., (2019), 28 pgs.

(56) References Cited

OTHER PUBLICATIONS

Murugan, V., et al., "A deep learning renn approach for vehicle recognition in traffic surveillance system", International Conference on Communication and Signal Processing (ICCSP), 2019, pp. 0157-0160., (Apr. 2019), 4 pgs.

Naik, P.P.S., et al., "A novel approach for color image segmentation using iterative partitioning mean shift clustering algorithm", 2015 International Conference on Communications and Signal Processing (Iccsp). IEEE, 2015, pp. 1516-1519., (2015), 4 pgs.

Ngo, G.C., et al., "Image segmentation using k-means color quantization and density-based spatial clustering of applications with noise (dbscan) for hotspot detection in photovoltaic modules", 2016 IEEE region 10 conference (TENCON). IEEE, 2016, pp. 1614-1618., (2016), 5 pgs.

Nie, P., et al., "Automatic detection of melanoma with yolo deep convolutional neural networks", E-Health and Bioengineering Conference (EHB), 2019, pp. 1-4., (Nov. 2019), 5 pgs.

Noh, H., et al., "Learning deconvolution network for semantic segmentation", Proceedings of the IEEE international conference on computer vision, 2015, pp. 1520-1528., (2015), 9 pgs.

Pedregosa, F., et al., "Scikit-learn: Machine learning in python", the Journal of machine Learning research, vol. 12, pp. 2825-2830, 2011., (Oct. 2011), 6 pgs.

Redmon, J., et al., "You only look once: Unified, real-time object detection", Proceedings of the IEEE conference on computer vision and pattern recognition, 2016, pp. 779-788., (May 2016), 10 pgs.

Ren, S., et al., "Faster r-cnn: Towards realtime object detection with region proposal networks", Advances in neural information processing systems, 2015, pp. 91-99., (Jan. 6, 2016), 14 pgs.

Ronneberger, O., et al., "U-net: Convolutional networks for biomedical image segmentation", International Conference on Medical image computing and computer- assisted intervention. Springer, 2015, pp. 234-241., (May 2015), 8 pgs.

Rousseeuw, P.J., et al., "Silhouettes: a graphical aid to the interpretation and validation of cluster analysis", Journal of computational and applied mathematics, vol. 20, pp. 53-65, 1987., (Nov. 1986), 13 pgs.

Szegedy, C., et al., "Rethinking the inception architecture for computer vision," in Proceedings of the IEEE conference on computer vision and pattern recognition, Arxiv, Dec. 2015, 10 pgs., (Dec. 11, 2015), 10 pgs.

Tang, Y., et al., "Multi-task enhanced dam crack image detection based on faster r-cnn", IEEE 4th International Conference on Image, Vision and Computing (ICIVC), 2019, pp. 336-340., (Jul. 2019), 5 pgs.

Tiihonen, T., et al., "Stefan boltzmann radiation on non convex surfaces", Mathematical methods in the applied sciences, vol. 20, No. 1, pp. 47-57, 1997., (Apr. 1996), 15 pgs.

You, J., "Weather data integrated mask r-cnn for automatic road surface condition monitoring", IEEE Visual Communications and Image Processing (VCIP), 2019, pp. 1-4., (Dec. 2019), 4 pgs.

You, W., et al., "Soldered dots detection of automobile door panels based on faster r-cnn model", Chinese Control And Decision Conference (CCDC), 2019, pp. 5314-5318., (Jun. 2019), 5 pgs.

Zhang, H., et al., "Context encoding for semantic segmentation", Proceedings of the IEEE Conference on Computer Vision and Pattern Recognition, 2018, pp. 7151-7160., (Mar. 2018), 11 pgs.

\* cited by examiner

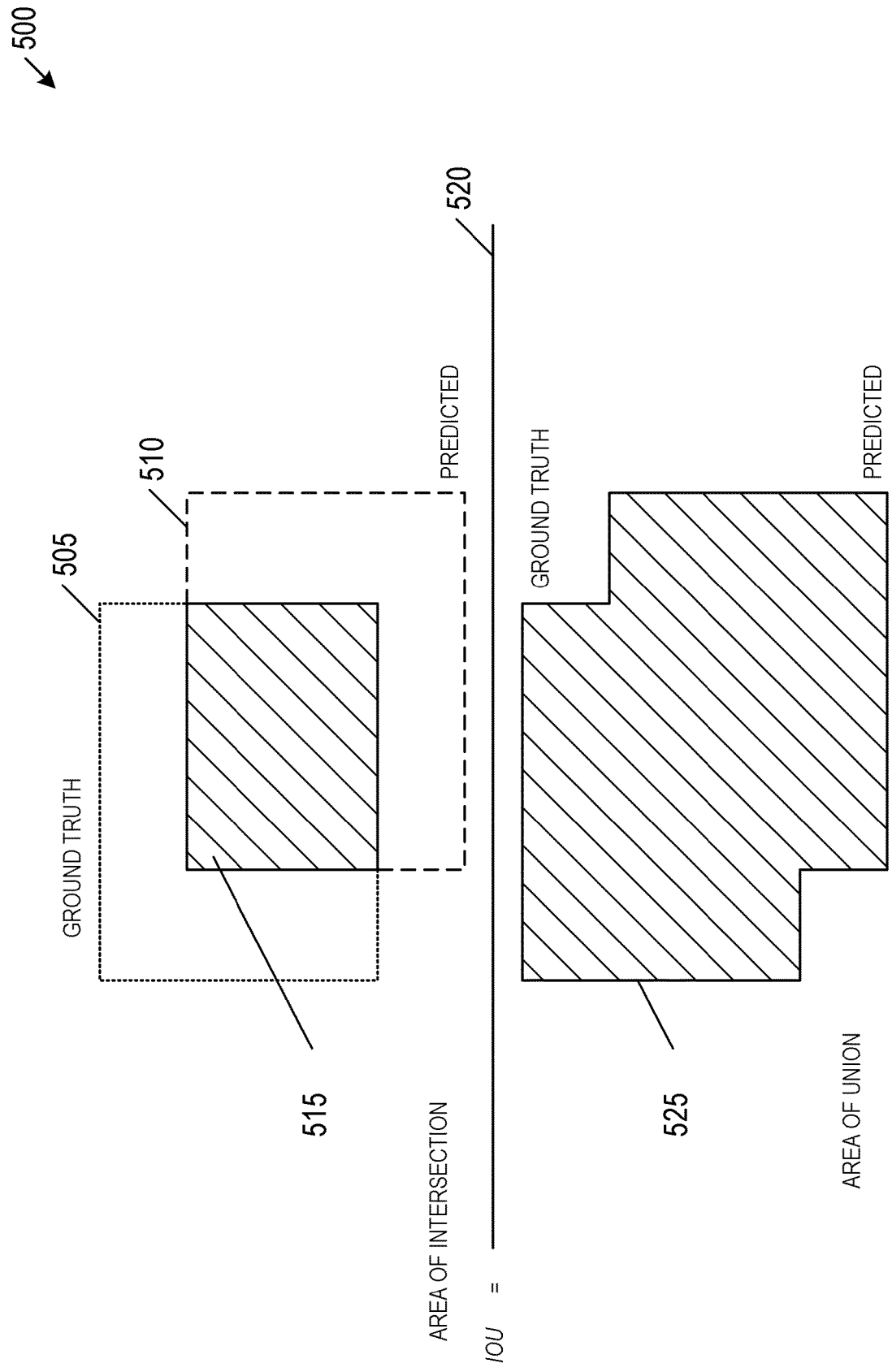

US 11,828,657 B2

SURFACE TEMPERATURE ESTIMATION FOR BUILDING ENERGY AUDITS

TECHNICAL FIELD

Embodiments described herein generally relate to building temperature estimation.

BACKGROUND

Heat loss quantification (HLQ) plays an important role in reducing overall energy consumption for operations in buildings. The usage of HLQ may also affect the environment and a building's life cycle. Some solutions for building HLQ use infrared thermography to measure building envelope parameters in-situ with the thermal transmittance values, or the amount of heat-flow in one square meter when the temperature difference is one Kelvin (U-value). However, the in-situ-based measurement of the U-value, along with the heat flowmeter method (HFM), is not always possible or accurate due to assumptions upon which the HFM methods are based, such as unidirectional heat flow. What is needed is an improved solution for quantifying building heat loss.

BRIEF DESCRIPTION OF THE DRAWINGS

FIG. 5 is a block diagram of the intersection over union, in accordance with at least one embodiment.

DESCRIPTION OF EMBODIMENTS

Figure 1:
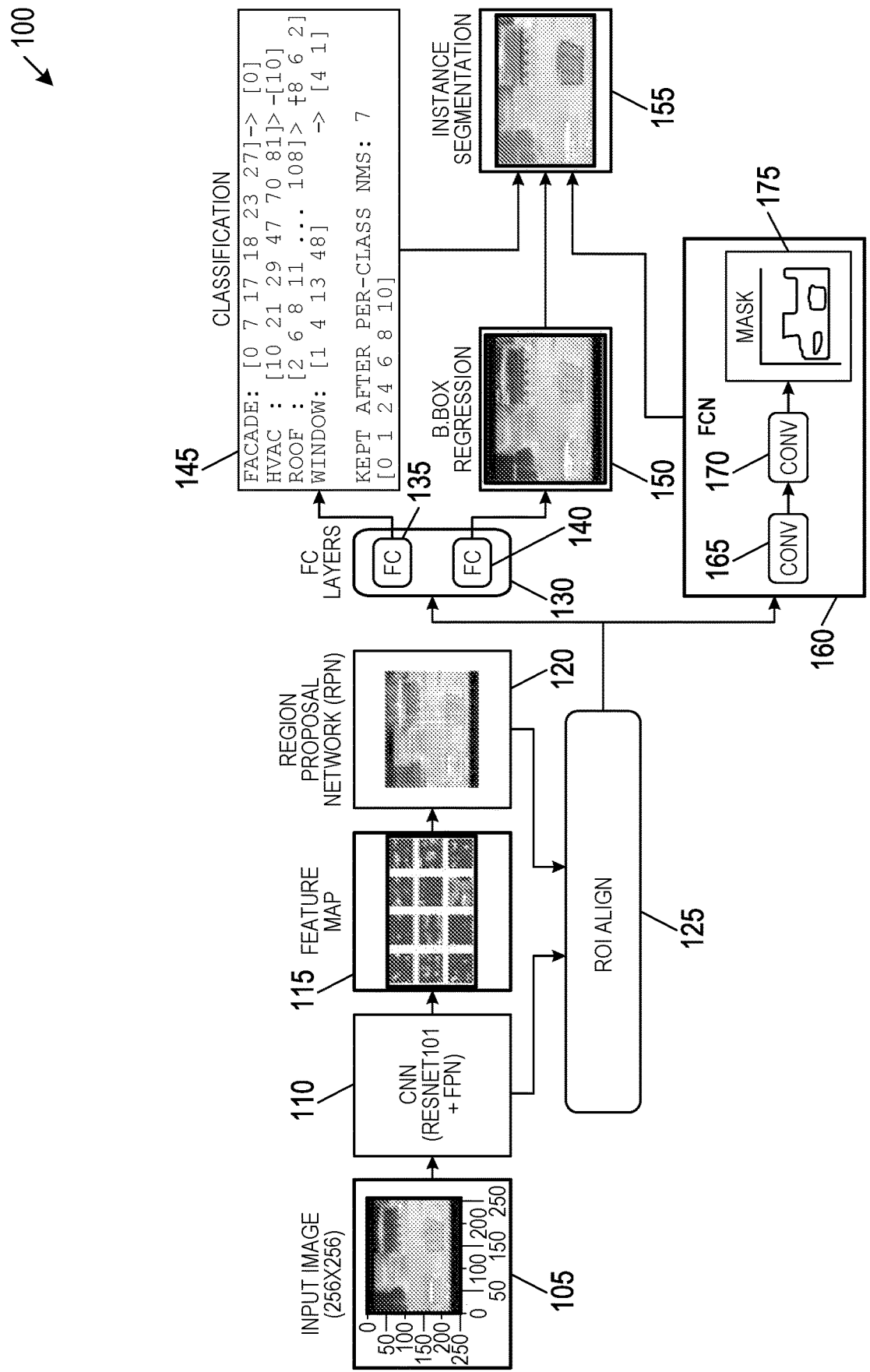
FIG. 1 is a block diagram of a building image segmentation Mask R-CNN architecture, in accordance with at least one embodiment.

The present subject matter provides various technical solutions to technical problems facing automated solutions in building energy audit applications. These solutions leverage heat loss quantification (HLQ) to improve a building's thermal performance and improve or optimize its energy usage. The technical solutions described herein provide various advantages. These solutions include application of deep-learning methods (e.g., subset of machine-learning methods) to segment large thermal imagery data sets (e.g., data sets including 100,000 images) from a drone (e.g., unmanned aerial system (UAS), unmanned aerial vehicle (UAV)).

The technical solutions described herein provide improved building thermal efficiency determination using multiple stages of computations to quantify the heat loss for a building envelope. In an example, these stages include object detection using Region Based Convolutional Neural Networks (R-CNN) (e.g., Mask R-CNN, Faster R-CNN), estimating the surface temperature using a clustering method, and calculating the overall heat transfer coefficient (e.g., the U-value). The clustering method used to estimate surface temperatures may include a K-means clustering method or a threshold-based clustering (TBC) method. These solutions further provide an improved building thermal efficiency determination that is robust over variations in building geometry, in variations in accuracy of acquired thermal images, and in variations in seasonal weather parameters, such as the outside or inside building temperatures, wind, time of day, and indoor heating or cooling conditions.

These solutions leverage HLQ in reassessing existing building envelopes to improve quantification of heat loss. An initial step in the building envelope energy usage improvement or optimization process is assessing the actual thermal performance. Building energy indicators, such as the energy performance or energy use intensity, may be used to express this performance. The building envelope in-situ measurement may be based on factors that are classified into three main categories: site conditions, building conditions, and operating conditions. The site conditions category refers to the weather conditions under which the tests are performed. These weather conditions include, wind velocity, rain, solar radiation, humidity, and other weather conditions, all of which may significantly alter the building's thermal performance quantification. The building condition category refers to the age of the building materials and the laying of the structural elements used during construction. The operating conditions category refers to the building's environmental management, such as heating or cooling, air circulation from the opening or closing of windows, building maintenance, and other operating conditions regardless of whether these activities are currently affecting the building envelope. These building factors are used to improve the evaluation of building heat loss quantification.

These solutions leverage thermal imagery obtained using drones. These airborne drones may be used to complete building inspections with improved speed and safety. In addition to on-demand building heat loss quantification, the improved speed and safety provided by these drones may be used to provide preventative building inspections and maintenance to mitigate problems before they become costly. Reducing the costs associated with insurance inspections is another benefit to building owners and managers. The risks associated with using drones for roof inspection are low compared to traditional methods, where employees risk injury as they traverse the building to inspect the structure. Drones are increasingly used for data collection; however, thermal images captured by drones often contain objects, such as trees and ground surfaces, all of which may affect the calculation of the U-value calculation.

Following collection of thermal image data, the thermal images may be segmented into regions of interest. Machine learning may be used to identify objects within the thermal images. Machine learning applies complex mathematical models to uncover hidden correlations between the different features in a given data set. Two types of machine learning techniques include supervised machine learning and unsupervised machine learning. Supervised machine learning techniques include specific rules that a machine learning operator (e.g., user, operator) provides for the machine. These rules allow the machine to either classify or predict the outputs of the model given an input. Unsupervised machine learning techniques may be applied when an operator does not provide rules, which may be used in segmenting large data sets. These techniques may be applied to reveal hidden correlations that the operator may not notice. Machine learning techniques may be based on feature selection, which may use human expertise to determine appropriate features. A class of machine learning called deep learning may not need human expertise to determine appropriate features. The present solutions may leverage deep learning techniques to improve quantification of heat loss.

These solutions provide a comprehensive data-driven approach that may be used on large data sets (e.g., 100,000 thermal images). Object identification may be used to classify objects accurately using instance segmentation to detect various building envelope structures, such roofs, walls, doors, windows, facades, and other building envelope structures. These solutions also provide a method for automated tagging, tracking pixel-to-pixel surface temperature values (e.g., pixel temperature), and reporting values in quantifiable and standard U-value estimation units. These solutions may use a cumulative U-value formula based on multiple U-value equations. These U-value equations may include a series of heat transfer equations that account for variations (e.g., pixel temperature, outside temperature, wind speed) to provide a quantitative measure of how that particular building object is performing compared to how it should theoretically be performing. These solutions extend direct thermal readings to account for multiple low ceiling thermal images per building object acquired from small scale aerial systems.

These solutions may estimate surface temperatures based on a K-means clustering method or a threshold-based clustering (TBC) method. These clustering methods may be used to estimate accurate surface temperatures of multiple instances of an object. A cumulative U-value (Uc) formula may use multiple U-value equations to estimate surface temperature for a region or envelope. The Uc formula used in these solutions result in fewer errors and lower error magnitudes compared to existing U-value equations. By detecting multiple instances of any building object (e.g., roof, windows, doors, facades) with greater accuracy, the present solutions reduce inaccuracies and provide a quantifiable way to address uncertainties in building thermal efficiency determination. These solutions account for numerous factors affecting building thermal efficiency, such as building geometry, season of the year, time of day, indoor heating or cooling conditions, past historical consumption, and power generation sources.

The following description and the drawings sufficiently illustrate specific embodiments to enable those skilled in the art to understand the specific embodiment. Other embodiments may incorporate structural, logical, electrical, process, and other changes. Portions and features of various embodiments may be included in, or substituted for, those of other embodiments. Embodiments set forth in the claims encompass all available equivalents of those claims.

FIG. 1 is a block diagram of a building image segmentation Mask R-CNN architecture 100, in accordance with at least one embodiment. Computer vision may be classified into various subcategories, such as object detection or segmentation. Object detection is more specific than classification in that it must draw a bounding box (BB) around every object identified. If an object detected has been identified completely, where all pixels have been associated with that object, it is considered a segmentation. Segmentation methods may be further divided into semantic, instance, and panoptic. All pixels belonging to all objects of the same class may be classified as one image segment in semantic segmentation. Instance segmentation classifies each instance as a segment even if the image is formed of objects of the same class. Panoptic segmentation combines both instance segmentation and semantic segmentation by assigning class labels to each unique object segmentation. Object detection and segmentation may be performed by using techniques such as histogram gradients. The present solution applies deep learning as an effective technique in computer vision segmentation.

The application of a classifier, such as a convolutional neural network (CNN), for detecting the presence of an object within each region of interest by splitting the images is one component within the present approach for deep learning segmentation. Conventional CNN concatenated with a classifier (e.g., fully-connected layer (FC) classifier) may be insufficient or unworkable for the number of object occurrences in each image, as the objects are not the same and may change the length of the output layer. The present solution may use region-based CNN (R-CNN) to mitigate issues facing conventional CNNs. The R-CNN may be used to extract region proposals using a selective search algorithm, such as extracting region proposals with 2000 regions or more. These proposals may be used to form warped regions on which a CNN is applied for feature extraction. This CNN-based feature extraction may be fed to a support vector machine classifier to classify the regions. This R-CNN is repeated for all images, where each image may include 2000 or more processed regions. In an example, each test image may require 47 seconds to process, which would include more than 26 hours of processing.

Processing time may be reduced by extending the R-CNN approach to a Fast R-CNN. This Fast R-CNN generates feature maps from the input images using CNN instead of feeding the region proposals to CNN. The region proposals are then identified and processed into squares. Regions of interest pooling is then applied to reshape the warped regions into a predetermined size, forming the input for an FC. The output layer of the FCs consists of a SoftMax classifier alongside a bounding box regressor. In an example, Fast R-CNN only required 0.32 seconds for testing and 8.75 hours for training, which demonstrated an improvement over a comparable R-CNN that required 47 seconds for testing and 84 hours for training. In another example, Fast R-CNN trained a 16-layer Visual Geometry Group (VGG16) network 9 times faster than R-CNN and performed 213 times faster at test-time. Fast RCNN and R-CNN both use selective search algorithms to determine the regions of interest (ROI), however the processing time is a consideration for each method. Processing time may be reduced further using an object detection algorithm similar to Fast RCNN called Faster R-CNN, which consists of a separate network to predict the region proposals, thereby reducing or eliminating selective search algorithms.

Region-based detection algorithms may perform predictions multiple times for various regions within each single image, which may be a time-consuming task. To reduce processing time, You Only Look Once (YOLO) may be used to model the detection task as a regression problem instead of using a region proposal. Each image is divided into several grids with two defined bounding boxes, increasing the speed of the detection algorithm. YOLO may achieve real-time object detection; however, it has several limitations such as a loss function. The YOLO loss function may treat errors induced by small and large bounding boxes equally. To address the YOLO loss function, a Fully Convolutional Network (FCN) may be trained for and used in semantic segmentation. Relying on the largest receptive field of the FCN network may not be sufficient for providing global context, and the largest empirical receptive field may not be sufficient for global capture. The FCN may be improved further using ParseNet, which improves upon FCN by allowing for global context inclusion in semantic segmentation.

A convolutional neural network (e.g., VGG-16) concatenated with a deconvolutional neural network (DNN) may be used for semantic segmentation. The network may consist of pooling for generating feature maps from the region in which the proposals are fed, which are then fed to the DNN. The DNN may then perform un-pooling to determine the pixel-wise probabilities belonging to each class. U-Net is a convolutional network built on FCN that may be used for image segmentation. U-Net may include a contractive side and an expansive side. The contractive side may include an FCN-like architecture extracting feature maps, while the expansive side spatially localizes patterns in the image subject to segmentation. A ResNet architecture may be modified to maintain higher resolution feature maps within the same convolution.

As shown in FIG. 1, a Mask R-CNN architecture 100 may be used to detect objects efficiently while simultaneously generating a high-quality segmentation mask for each image. A CNN network may be added to the model parallel to the object detection task to determine the mask or the pixels belonging to the objects. The Mask R-CNN architecture 100 may be configured such that it is not used in real-time analysis and is made up of two blocks. The first block, or backbone, receives an input image 105 in a CNN 110, generates a feature map 115, and generates a region proposal 120. The second block includes a ROI classifier 156 and a bounding box regressor 150, which classifies the regions proposals 120 and generates the bounding boxes and masks 175. The CNN 110 serves as a feature extractor, and may include ResNet50 or RestNet101. In an example, as the features pass through the backbone network, the images may be converted from 1024×1024×3 (RGB) to a feature map of shape 32×32×2048. The resultant feature map 115 serves as the input for the regional proposal network 120.

The Mask R-CNN architecture 100 may use a Feature Pyramid Network (FPN) as an extension, which may improve standard feature extraction. FPN enables access to both lower-level and higher-level features. The Region Proposal Network (RPN) 120, a type of lightweight neural network, scans over the backbone feature map once it is generated. The regions over which the RPN 120 scans are performed may be referred to as anchors. For each anchor, the RPN 120 generates an anchor class consisting of either a foreground class or a background class. The foreground class identifies whether there is an object in that box. The background class is the Bounding Box Refinement, which is a foreground anchor. This foreground might not be centered perfectly over the object, and thus, to refine the anchor box, the RPN 120 may be used to estimate a change in the box's coordinates, also referred to as delta (Δ).

A Region of Interest (ROI) alignment block 125 runs on the regions of interest proposed by the RPN 120. The bounding box refinement step in the RPN 125 may result in various sizes for ROI boxes that must be adjusted to the same size. The ROI alignment block 125 may be used to create a fixed input for the ROI classifier. The stride may not be quantized in the ROI alignment block 125, and bi-linear interpolation may be considered, while Faster R-CNN may use a quantized stride. The ROI alignment block 125 may generate outputs for each ROI, which may be used in fully connected layers 130. Fully connected layers 130 may include a first fully-connected layer 135 for classification 145 and a second fully-connected layer 140 for the bounding box regression 150. The bounding box regression 150 may refine the location and size of the box to encapsulate the ROI object. The ROI alignment block 125 may also generate outputs for fully convolutional network 160, which may include first convolution 165 and second convolution 170 to generate a mask 175. The output result of the Mask R-CNN architecture 100 may include generation of instance segmentation masks 155, such as from classification 145, bounding box regression 150, or fully convolutional network 160. The segmentation mask branch consists of a convolutional network, which may use positive regions selected by the ROI classifier and generate one or more instance segmentation masks 155.

Instance segmentation may be based on one or more implementations. A Context Encoding Network (EncNet) may include a CNN with different backbones (e.g., ResNet) to generate feature maps. The output of this last CNN layer may be fed into a second block within EncNet, which may include a context encoding module. The output of this context encoding module may be reshaped and processed by a dilated convolution strategy, while simultaneously minimizing binary cross-entropy losses and a final pixel-wise loss. Another instance segmentation implementation may include panoptic segmentation to unify semantic segmentation and instance segmentation. Panoptic segmentation may apply a quality metric to evaluate the overall segmentation. The evaluation metric may then be written as the product of two terms: the segmentation quality (SQ) and one recognition quality (RQ).

Various image clustering techniques may be used to identify, classify, and process regions of interest within images, such as red-green-blue (RGB) images or infrared (IR) images. A hybrid approach may include application of K-means and a Density Based Spatial Clustering of Application with Noise (DBSCAN) segmentation approach to identify image hotspot regions, such as hotspot regions within IR images of photo voltaic (PV) arrays. Image pixel color values may be normalized and pre-processed using the K-means method to segment the image into discrete regions of colors. This method may be used to create distinct silhouettes of the various color profiles within the image. DBSCAN may be applied subsequently to obtain the pixel regions, which may be above a set threshold of saturation in a hue-saturation-value (HSV) color palette.

A 2D spatio-temporal image clustering technique may be used to detect and cluster regions of crimes, which may be identified as hotspots. A K-means may be used to classify different regions within a dataset that contained (x, y) coordinates, times, and dates for events in each image. A number of instances of these K-means clusters may be calculated and passed through a threshold to discretely obtain regions of hotspots within an image. This threshold may be based on the number of instances of each cluster and the total number of clusters. When combined with ensemble machine learning models, the use of clustering may be used to increase accuracy of crime prediction across various crime categories, such as vandalism, bribery, and extortion.

A two-part image clustering technique may be used to cluster pixels within an image. The RGB query image may be pre-processed to grayscale. A histogram analysis may be performed based on the intensity or the brightness values of the gray scale image followed. The resultant histogram may serve as a one-dimensional space for a K-means based approach to cluster pixels. This technique may include calculation of two-dimensional gradient with vectors that to point to higher intensity value pixels, and may processes these pixels as black or white based on a set H-threshold.

Another image clustering technique includes a clustering method based on Intuitionistic Fuzzy Set (IFS) theory and Fuzzy C-means (FCM) to segment images generated with magnetic resonance imaging (MRI). The C-means algorithm may not perform well with noise, so an Intuitionistic Fuzzy C-means with Spatial Neighborhood Information (IF-CMSNI) method may be used to preserve valuable spatial information through a spatial neighborhood information equation, which may be used to provide a significant improvement over Modified Intutionistic Fuzzy C-means (MIFCM) or Fuzzy Local Information C-means (FLICM) in the presence of Rician noise.

Another image clustering technique includes Directly Estimated Misclassification Probabilities (DEMP-k), which may be based on a combination of the Homoscedastic Spherical Components (HoSC) K-means and hierarchical linkage functions, thereby increasing the speed and performance of the algorithm. This technique may include a framework for hierarchical merging based on pairwise overlap between components, which may be applied to a K-means algorithm.

Another image clustering technique includes Iterative Partitioning-Mean Shift (IP-MS), where the number of centroids chosen for each cluster and the number of iterations may be used as key parameters for image segmentation. Each image may be pre-processed by reducing the noise, transforming the RGB image to a LAB color space, and normalizing the pixel values. The clustering algorithms may then classify each pixel by finding the minimum Euclidean distance between pixels for each centroid and calculating the mean distance value for each cluster. Once the mean equals the number of centroids specified by the algorithm, convergence is reached, or the algorithm has successfully executed. This technique may be used to provide marked performance increase in the accuracy and computation time when compared to the K-means algorithm.

Figure 2:
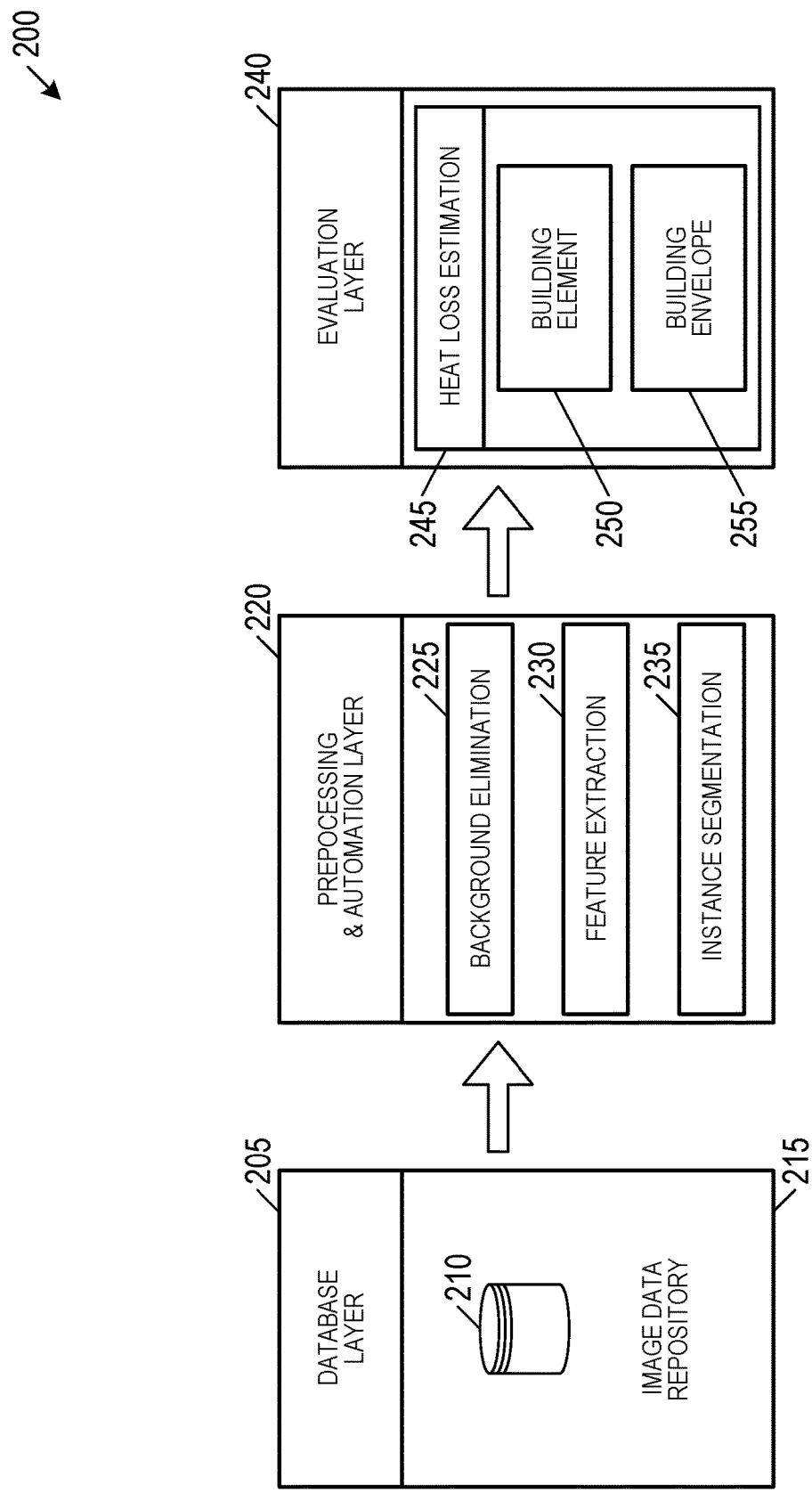
FIG. 2 is a block diagram of a thermal performance evaluation framework, in accordance with at least one embodiment.

FIG. 2 is a block diagram of a thermal performance evaluation framework 200, in accordance with at least one embodiment. Framework 200 may provide a methodology for data preparation in a database layer 205, preprocessing in a preprocessing and automation layer 220, and evaluation in an evaluation layer 240. Infrared (IR) thermal imagery may be used in building thermal performance evaluation, which may benefit from extensive IR thermal imagery features, high performance abilities, and relatively lower cost. The thermal images may be preprocessed, which may include removal of unwanted background objects and detection of inspected elements, such as windows, doors, walls, and other features. Framework 200 provides a fully automated three-layer framework for the U-value estimation of a building and its elements.

Raw thermal imagery may be captured from various sources, such as aerial or ground measurements, and may be stored in an image data repository 210 within image data repository 215. The images may then be fed into a preprocessing and automation layer 220, where a series of background elimination steps 225 are completed, critical features from the thermal images are extracted 230, and images are segmented 235. Various building elements (e.g., doors, roofs, facades, beams, windows) may be annotated and used for training machine learning models on object detection.

Within the evaluation layer 240, the heat loss estimation 245 may be used to estimate heat loss for a building element 250 or for a building envelope 255. This evaluation may be based on analysis of various thermal parameters, such as the emissivity and reflected temperature.

The number of objects in each dataset may not be distributed equally, such as due to the nature and context of the dataset itself. For example, a frequency of HVACs and doors may be lower than a frequency of windows or facades for any given building, causing lower detection limit discrepancies for these respective objects. To address this unequal distribution, multiple augmentation techniques may be applied to each dataset. These augmentation techniques may include random color shifts, multiplying the dataset with copies of itself, horizontal and vertical flips, Gaussian blur, contrast and brightness, and other augmentation techniques. The augmentation may increase the original dataset by a factor of six or more. To further address this unequal distribution, datasets may be combined, such as combinations based on common buildings. This building combination may be used to increase the frequency of objects with otherwise low occurrences, which enables the model to learn and identify these objects more accurately.

Figure 3:
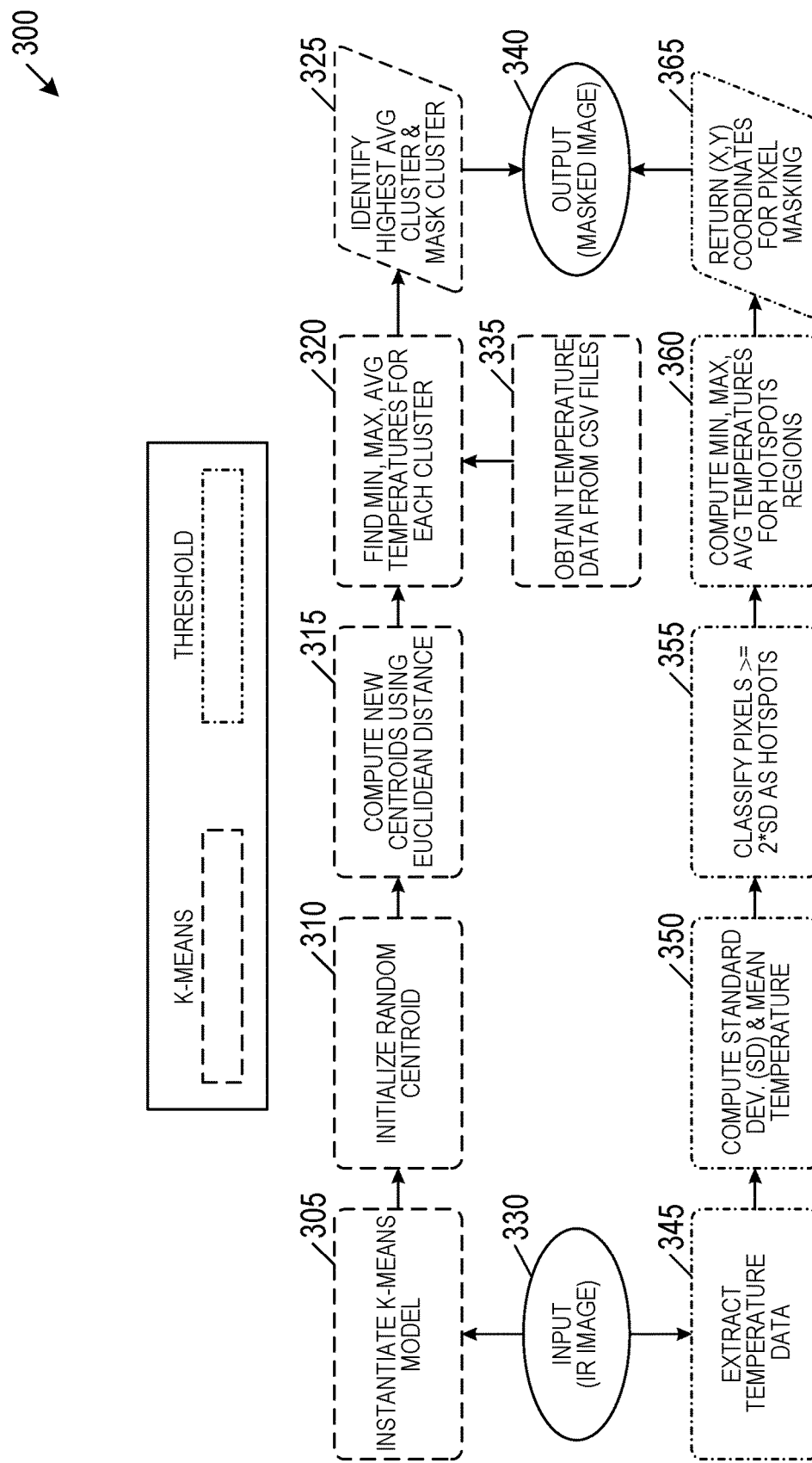
FIG. 3 is a block diagram of a thermal image clustering flowchart, in accordance with at least one embodiment.

FIG. 3 is a block diagram of a thermal image clustering flowchart 300, in accordance with at least one embodiment. Flowchart 300 shows thermal image clustering using K-means and Threshold-Based Clustering. These approaches provide advantages over techniques that classify window-only or façade-only pixels for an image and applied the use of a static threshold based on percentiles, which may insufficiently adapt and identify hotspots under extreme variations in the input surface temperatures.

Threshold-Based Clustering (TBC) may be based on extracted temperature 345, and may calculate a mean temperature ($\mu$) and standard deviation ($\sigma$) of each object 350. TBC may consider object temperatures of $>=2\sigma$ 355, and process the object pixels corresponding to those temperatures. The following piece-wise functions may be represented, mathematically, as $$I_{x,y} = \begin{cases} 1, & \text{if } t_{x,y} >= 2\sigma + \mu[T_o] \\ 0, & \text{if } t_{x,y} < 2\sigma + \mu[T_o] \end{cases} \quad (1)$$

$$(\hat{R}, \hat{G}, \hat{B})_{x,y}^{pixel} = \begin{cases} (255, 0, 0)_{x,y}^{pixel}, & \text{if } I_{x,y} = 1 \\ (R, G, B)_{x,y}^{pixel}, & \text{if } I_{x,y} = 0 \end{cases} \quad (2)$$

where $I_{x,y}$ is the Identity Matrix that holds hotspot (binary 1) and non-hotspot (binary 0) pixels, $t_{x,y}$ is the pixel at coordinates (x, y), and $T_o$ is the set of all pixels within an object of interest, such as the walls or windows. ($\hat{R}$, $\hat{G}$, $\hat{B}$) pixel represents RGB pixels at coordinates (x, y) that are colored red for a detected hotspot and unchanged if not. The thresholds on surface temperature may be evaluated using thermal imaging software. These thresholds may be visually intuitive: when looking at the raw thermal image, the regions of longer wavelengths in the visible light spectrum, represented in red, are the areas with a greater density of pixels denoting a higher temperature. The user may identify these regions as hotspots and use a shaping tool to draw boundaries for segregating the image into hotspot sections. However, this user intervention may result in a tedious and inaccurate process, and may yield primarily or exclusively maximum, minimum, and average temperatures. These maximum, minimum, and average temperatures regions may be identified 360 on a granular level using TBC, where each pixel may be analyzed for suitability as a hotspot. Hotspot regions are higher temperatures, and due to heat dissipation, are considered regions of significance when estimating U-values. The TBC may then return coordinates (x, y) for pixel masking 365.

K-means clustering may also be used to provide hotspot detection. K-means may be used to group 'N' observations into 'K' clusters with the nearest mean, or centroid of a cluster, by minimizing the squared Euclidean distances. Groupings of surface temperature observations may be evaluated from captured thermal images, where the images may be divided into 'K' clusters based on different colors formed by the combinations of color channels. The surface temperature observations may be compared with TBC for the reliability of the clustering method. K-means segments an image into different clusters based on colors. This approach is based on the idea that the colors in a thermal image represent different temperatures regions. This method may be further divided into two parts: segmentation and hotspot identification. The minimum, maximum, and average temperatures may be calculated for each cluster using the pixel temperature data from the CSVs when using hotspot identification. The methodology of the clustering phases is further explained below:

1. Instantiate K-means model 305 and assign initial cluster centers 310 randomly from data vectors for $p_1, p_2, \ldots p_n$.
2. A new pixel is chosen, and the Euclidean Distance is calculated 315 from each centroid;
3. If the pixel is closer to a certain centroid, then it is assigned to that cluster.
4. Iterate
   a. Step 3 assign each pixel to the cluster that has the closest mean;
   b. Calculate the new mean using Euclidean Distance for each cluster.
   c. Steps 2 and 3 are iterated 100 times until convergence criteria is met.
5. Output the clusters members with centroids.
6. Obtain temperature data from files 335 and find min, max and avg temperature for each cluster 320.
7. Assign cluster associated to max avg of all clusters as hotspot 325.

An image may be decomposed in a 3D vector of colors comprised of combinations of (i.e., Red, Green, and Blue) with value ranges from 0-255 for each channel. A cluster may be determined by grouping those pixels with the least Euclidean Distance from the chosen centroid. Considering two pixels i and j with values (Ri, Gi, Bi) and (Rj, Gj, Bj). The Euclidean distance Dij between them may be further computed as follows:

$$D_{ij} = \sqrt{(R_i - R_j)^2 + (G_i - G_j)^2 + (B_i - B_j)^2} \quad (3)$$

K-means proceeds by selecting random pixels as centroids. This method of initializing the centroid may include an improved seeding method K-means++. K-means may be used to reduce the Sum of Squared Distance for each cluster at every iteration. This is achieved by selecting new pixels as centroids and calculating the Euclidean distance with their respective cluster members. Equation (4) shows that, for each cluster from n=1 to N, a cluster is chosen, and the Euclidean Distance between a pixel in n and the centroid is calculated. This is iterated over and over for every cluster n to minimize J by selecting new pixels Pn and centroids Cn.

$$J_{min} = \sum_{n=1}^{N} \sum_{P \in \pi} D_{C_n P_n} \quad (4)$$

Computing the K-means for such large datasets raises the question of selecting the range of clusters. To address this, the Elbow Method may be used to consider the sum of distances between cluster centers and their respective cluster members in view of the number of clusters. For each dataset, this may be computed to obtain a range of k or a number of clusters to provide improved or optimized number that is ideal for that data set.

Figure 4:
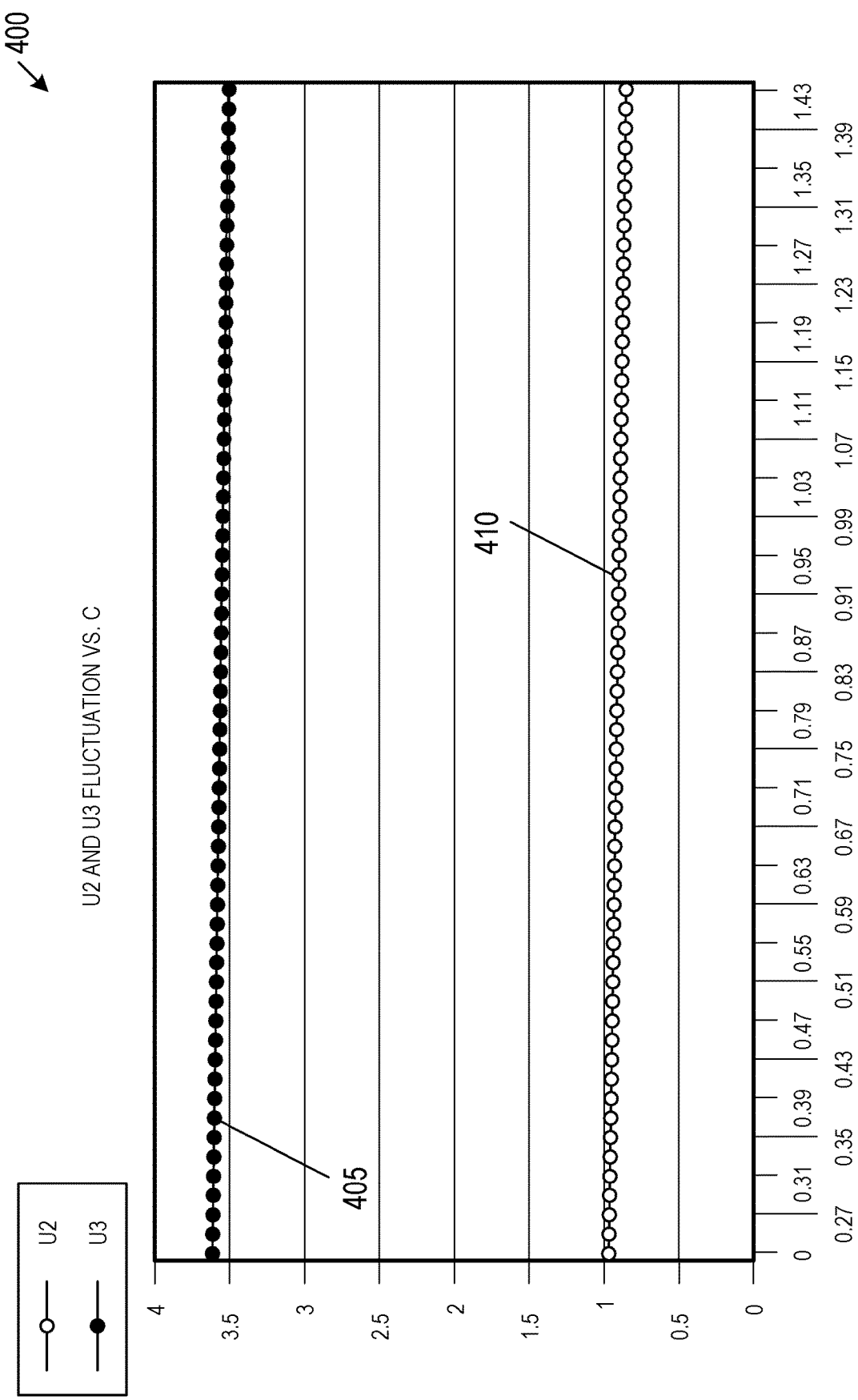
FIG. 4 is a graph of U-value measurements, in accordance with at least one embodiment.

FIG. 4 is a graph of U-value measurements 400, in accordance with at least one embodiment. Various U-value measurement methods may be used to estimate thermal performance. Based on the Stefan-Boltzmann law, radiative heat varies with the fourth power of temperature difference. The U-value estimation for an external surface may be carried out while considering the wind velocity using the equation (5):

$$U_1 = \frac{\epsilon\sigma(T_{sc}^4 - T_{ae}^4) + 3.805v(T_{sc} - T_{ae})}{T_{ai} - T_{ae}} \quad (5)$$

where v is the velocity of the external wind, $T_{se}$ denotes the external surface temperature, $T_{ai}$ denotes the internal air temperature, and $T_{ae}$ denotes the external air temperature. The radiative heat component is similar to the Stefan-Boltzmann equation and the convective term is derived from Jargon's formula. The U-value may be estimated according to the Stefan-Boltzmann law as follows:

$$U_2 = \frac{4\epsilon\sigma T_s^3(T_{si} - T_{refl}) + \alpha_c(T_{si} - T_{ai})}{T_{ai} - T_{ae}} \quad (6)$$

where the wall emissivity and convective heat coefficient is denoted by $\epsilon$ and $\alpha c$, respectively. In addition, a denotes the Stefan-Boltzmann constant and $T_{in}$, $T_{out}$, $T_{si}$, and $T_{refl}$ denote internal, external, internal surface, and reflexive wall temperatures respectively. The surface temperature is denoted by $T_s$. The mean temperature is introduced in Equation (7) to replace the surface temperature in Equation (6) to estimate the U-values as follows:

$$U_2 = \frac{4\epsilon\sigma T_m^3(T_{si} - T_{refl}) + \alpha_c(T_{si} - T_{ai})}{T_{ai} - T_{ae}} \quad (7)$$

where $T_m = T_s + T_{refl}$ denotes the mean temperature, and e and σ denote the emissivity and Stefan-Boltzmann constant, respectively. In this equation, the reflective temperature is subtracted from the surface temperature. Spectrum emissivities of 0.75 for the wall and 1.0 for windows were taken. The material for walls was considered to be fire brick, the windows were classified to be of a smooth glass material with emissivities in the range of 0.92-0.96, and glass was considered to be a perfect black body in the context of U-value estimation as there would be negligible differences if we use Equation (5) to calculate the U-values. The convective coefficient ac depends on various factors, including the height of the wall and the temperature difference shown in Equation (8):

$$\alpha_c = c_1 \frac{(T_{si} - T_{ai})^{\frac{1}{4}}}{L} \qquad (8)$$

where L is the height of the wall and the value of $c_1$ varies from 1.31 to 1.42. Equation (8) is obtained from reference, where $c_1$ varied from 0.25 to 1.42 depending on the type of airflow. When the wall is tall, and the temperature difference is large, the coefficient may change depending on the type of flow (e.g., turbulent, laminar).

The graph of U-value measurements 400 depicts U2 410 and U3 405, and illustrates the deviation of the U-value with respect to acceptable $c_1$ values within the range of 0.25 to 1.42. The acceptable range of $c_1$ values was deduced empirically. Several types of objects and their corresponding U-values were plotted with $c_1$ values varying from 0.25 to 1.42. These U-values were then converted to BTU/ft² h°T first and then to W/m²·K. Uc may be considered as the average of the U-values, calculated as follows:

$$U_c = \frac{U_1 + U_2 + U_3}{3} \qquad (9)$$

Temperature information may be extracted into a file, such as a CSV file containing 512×640 cells. The building height information was obtained from the architectural diagram.

FIG. 5 is a block diagram of the intersection over union 500, in accordance with at least one embodiment. The performance of deep-learning-based thermal image instance segmentation may be evaluated and improved suing a confusion matrix, which may be used to indicate true positive (TP), false positive (FP), true negative (TN), or false negative (FN) outcomes. Table 1 shows a confusion matrix that is defined to show a given deep-learning-based thermal image instance segmentation model's ability to correctly and incorrectly identify objects:

TABLE 1

Confusion Matrix

|  | Positive (1) | Negative (0) |
| --- | --- | --- |
| Positive (1) | TP | TN |
| Negative (0) | FP | FN |

Average precision (AP) may be used to measure the accuracy of object detection. The average precision computes the AP value for a recall value of 0 to 1. The precision quantifies the percentage of correct predictions. Recall values measure how well the positive values are detected. The mathematical definitions of precision and recall are shown as follows:

$$\text{Precision} = \frac{TP}{(TP + FP)} \qquad (10)$$

$$\text{Recall} = \frac{TP}{(TP + FN)} \qquad (11)$$

As shown in FIG. 5, the intersection over union (IoU) is used to determine true positives (TPs). An overlapping area in common to both the ground truth 505 and the predicted values 510 is used to determine the area of intersection 515. Similarly, a total area occupied by the ground truth 505 and the predicted values 510 is used to determine the area of union 525. The IoU measures the area of overlap between the ground truth and prediction boundaries. Mathematically, the intersection over union is calculated as the ratio 520 of the area of the intersection to the area of union:

$$IoU = \frac{A_o}{A_u} \qquad (12)$$

where $A_o$ and $A_u$ are the area of intersection 515 and area of union 525, respectively. If the IoU is greater than the threshold, the detection is considered to be correct, otherwise the detection is considered to be a false detection.

The general definition of the average precision (AP) is finding the area under the precision-recall curve:

$$\int_0^1 p(t)dt \qquad (13)$$

The interpolated AP is calculated by replacing p(t) in Equation (13) by $$\int_0^1 \max_{r \geq t}(r)dt \qquad (14)$$

Figure 6B:
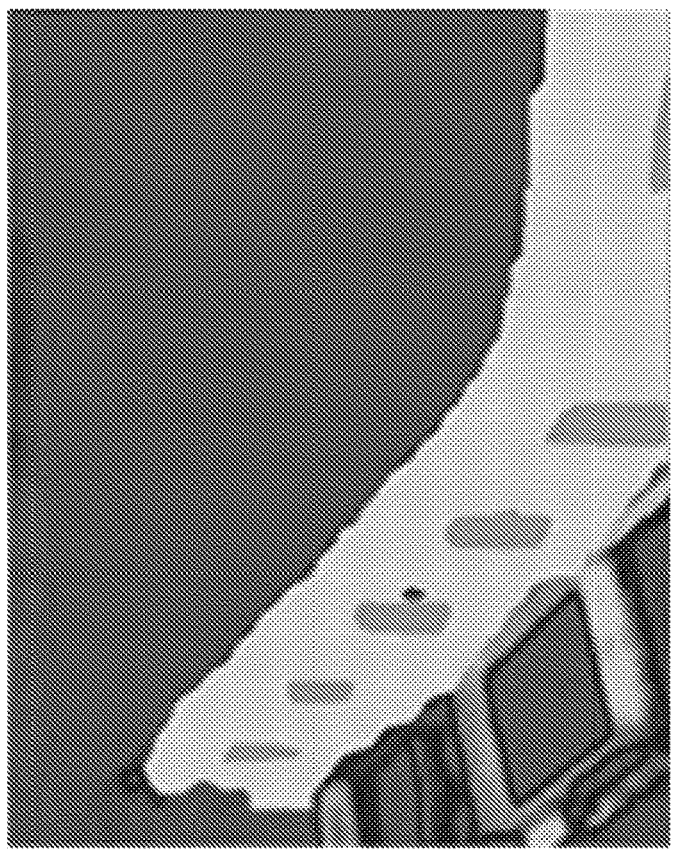
FIGS. 6A-6B are segmented building images, in accordance with at least one embodiment.
Figure 6A:
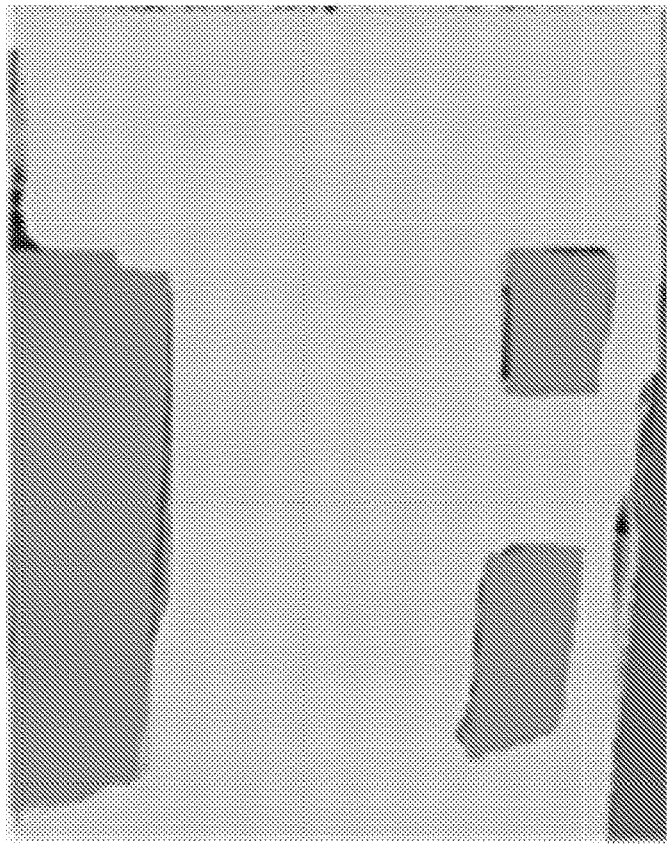

FIGS. 6A-6B are segmented building images 600, in accordance with at least one embodiment. Segmented building images 600 show examples of model interference, such as the UND Museum building 605 shown in FIG. 6A and the Minot State Building 610 shown in FIG. 6B. These segmented building images 600 were generated using Mask-RCNN models trained on the heat loss dataset, and show results of detection and instance segmentation based on the deep learning solutions described herein. In an example, the Mask-RCNN models may be trained on a machine containing an Intel processor one or more Nvidia GPUs, where each model was trained on one GPU with various model configurations, and the model with the best metrics was chosen to be trained on by the next dataset. The various model configurations included variations in batch size, learning rate, and number of epochs. Reducing the learning rate by a factor of ten at each subsequent training session may be used to improve model accuracy. This improved model accuracy may be based on including datasets containing data from buildings with similar architectures. Conversely, using a higher learning rate on a dataset that includes dissimilar buildings may improve model accuracy. Training time for each dataset may be proportional to the number of images found within each data set.

In an example, test datasets may be generated with a subset of images available from different groups of buildings (e.g., different locations). The subset of images used to generate the test datasets may be deleted subsequently from their original datasets to eliminate them from the machine learning process. Augmentation techniques may be applied to the test dataset to increase the size and test the fitness of each model. Various building feature classes may be identified for model training, such as windows, facades, roofs, HVACs, doors, or other building feature classes. In an example, models may be evaluated after each training session and average precision at thresholds of 25%, 50%, and 75% were be recorded, and the results show that Mask R-CNN outperformed the other models for all thresholds. In this example, other models especially suffered at the 75% threshold, which indicates that the Mask R-CNN solution described herein outperforms other methods especially when identifying multiple objects with high confidence.

The Mask R-CNN model described herein provides advantages over other models. When quantifying heat loss on buildings, the U-value equations may be extremely sensitive to small shifts in temperature and emissivity. This sensitivity required the present solutions to be precise. This includes improving over traditional bounding box detection, which may introduce noise because the object contour is not calculated. The instance segmentation described herein provides improved accuracy in classifying results. Because of the effect of emissivity on the U-value equations, the emissivity may be selected based on the material composition of the object in question. The Mask R-CNN model described herein also yields better results when compared to the Faster R-CNN models with different backbones. This improvement is evident even when object detection and instance segmentation models were trained in a similar fashion with varying learning rate decay and a constant number of epochs for both types of models. In an example, the datasets may be processed after the data has been collected and augmented. In another example, the datasets may be processed in real-time, such as while a UAS is gathering and sending captured data in real-time. The datasets may be compressed and secured with data encryption (e.g., AES-256) at a local dedicated server receiving real-time data or through a cloud data services provider (e.g., Amazon Web Services). The compression and encryption may improve security, improve data transfer speeds, and improve the speed of U-value calculations.

Figure 7D:
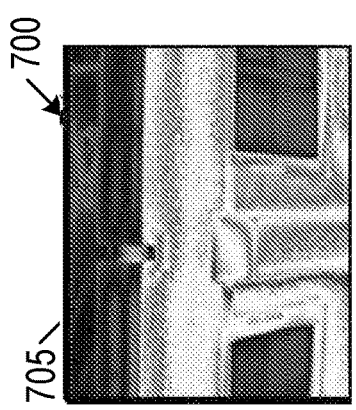
FIGS. 7A-7L are hotspot building images, in accordance with at least one embodiment.
Figure 7H:
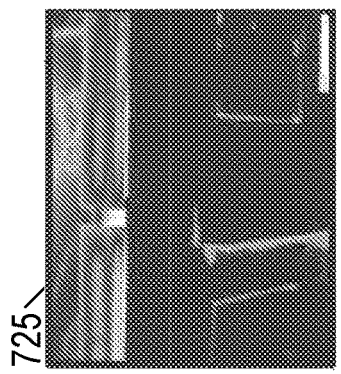
Figure 7L:
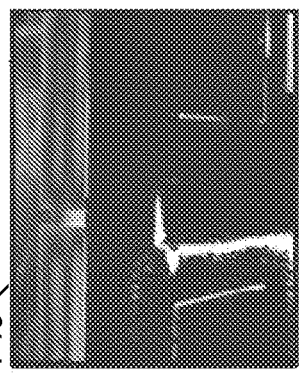
Figure 7C:
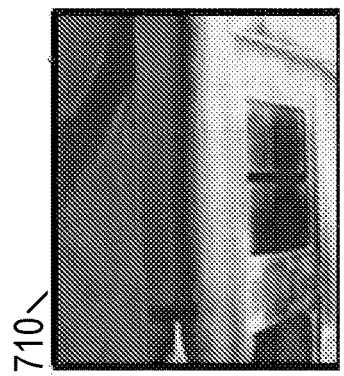
Figure 7G:
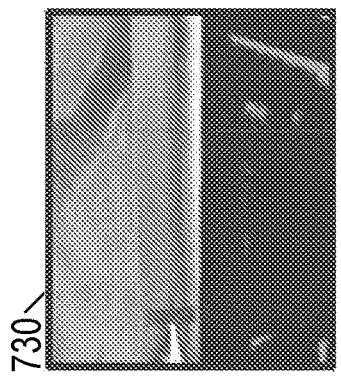
Figure 7K:
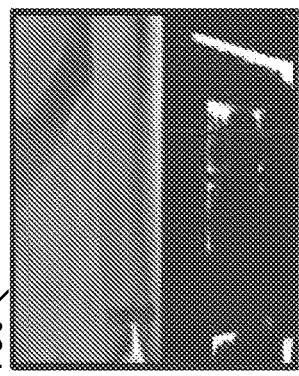
Figure 7B:
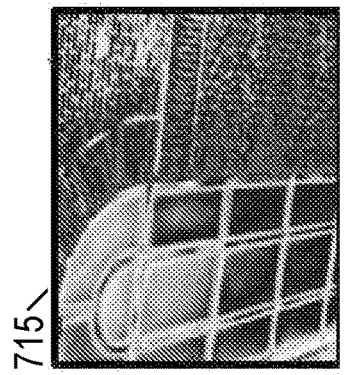
Figure 7F:
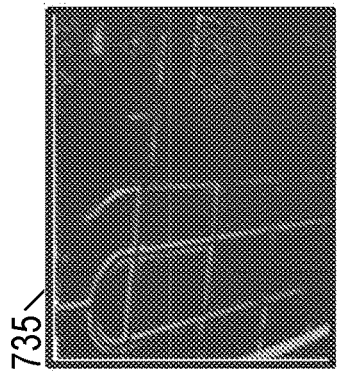
Figure 7J:
Figure 7A:
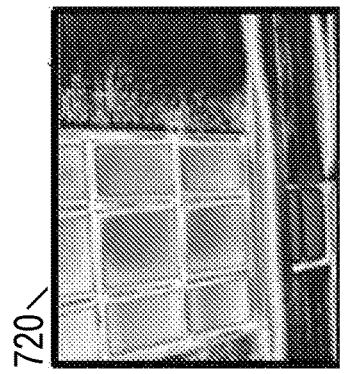
Figure 7E:
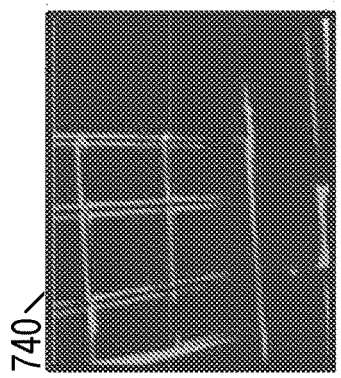
Figure 7I:
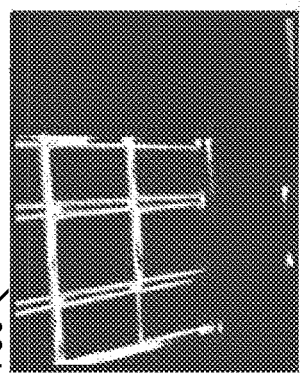

FIGS. 7A-7L are hotspot building images 700, in accordance with at least one embodiment. Hotspot building images 700 show hotspot regions in discrete red and yellow sub-regions for raw and hotspot images for four windows taken during the morning and evening using the TBC and K-means approaches:

FIG. 7A shows a raw image for first window in the morning 705;

FIG. 7B shows a raw image for second window in the evening 710;

FIG. 7C shows a raw image for third window in the morning 715;

FIG. 7D shows a raw image for fourth window in the evening 720;

FIG. 7E shows a TBC image for first window in the morning 725;

FIG. 7F shows a TBC image for second window in the evening 730;

FIG. 7G shows a TBC image for third window in the morning 735;

FIG. 7H shows a TBC image for fourth window in the evening 740;

FIG. 7I shows a K-means image for first window in the morning 745;

FIG. 7J shows a K-means image for second window in the evening 750;

FIG. 7K shows a K-means image for third window in the morning 755; and

FIG. 7L shows a K-means image for fourth window in the evening 760.

The K-means hotspot building images FIGS. 7I-7L were generated based on various metrics for K-means, such as Silhouette Coefficient and Davis-Bouldin Index. The Silhouette Coefficient may be used to determine a quality of clustering. It is a comparison between how similar a particular data point or pixel value is to its own cluster and how similar that data point or pixel value is compared to other clusters. The Silhouette Coefficient ranges from −1 to 1, where a positive value signifies that the clustering was well performed. The Davis-Bouldin Index may be used to generate an average of the similarity for a cluster to its nearest cluster, which is a ratio of the intra-cluster distance to the inter-cluster distance. The minimum score is 0, with lower values indicating better clustering. In an example, the Silhouette Coefficient for the first pair of windows and the second pair of windows were 0.71 and 0.68, and Davis-Bouldin Index for the pairs of windows were 0.81 and 0.75, respectively.

Figure 8A:
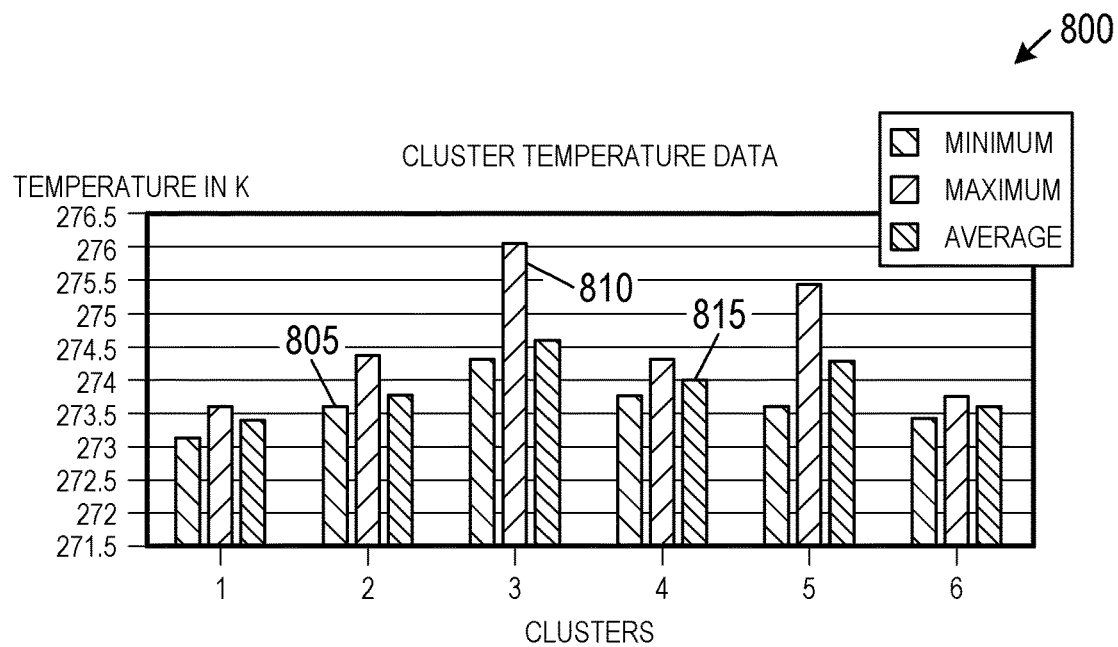
FIGS. 8A-8B are cluster graphs, in accordance with at least one embodiment.
Figure 8B:
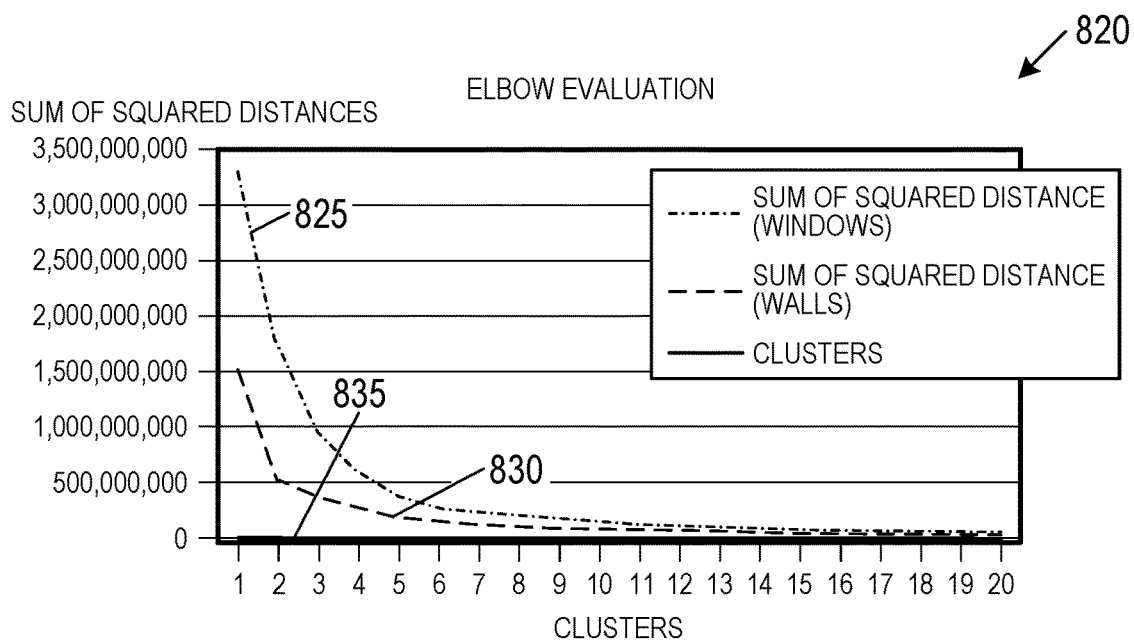

FIGS. 8A-8B are cluster graphs 800, in accordance with at least one embodiment. FIG. 8A shows cluster temperature data, including minimum 805, maximum 810, and average 815 surface temperatures for six clusters created in the segmentation phase. The cluster with the highest average temperature may be chosen as the hotspot, such as cluster 3 shown in FIG. 8A. FIG. 8B shows elbow evaluation for an image from the museum dataset, including sum of squared distance values for windows 825, sum of squared distance values for walls 830, and clusters 830. In the example shown in FIG. 8B the k-value for the walls may be selected to be somewhere between 3 and 6, as the squared distance does not change significantly after the seventh cluster. In an example, using a hotspot evaluation technique involving pixel temperatures, a k-value of six may be chosen using the temperature TBC as the ground truth. Computing the K-means to six clusters yielded results with few deviations with respect to average hotspot temperature and density of hotspot from TBC. A value of K=5 yielded results similar to the TBC for the windows.

Various metrics may be used to assess and improve performance of the clustering approaches based on a fixed set of five parameters across the morning, afternoon, and evening time periods. A density (hotspot) metric may be used to indicate a ratio of a number of hotspot pixels to a total number of pixels within the entire surface being measured, such as windows or facades. Similarly, an average temperature (hotspot) metric may indicate an average temperature of hotspot regions identified by each of the clustering methods. Discrepancies among metrics may be caused by various environmental differences. In an example, a large discrepancy was caused by an incidence of solar radiation on a building surface.

As suggested by cluster graphs 800, average hotspot temperatures across various times of day may be taken into account. Values obtained for these measures may be consistent across the morning, afternoon, or evening time periods. A maximum temperature difference may be used to determine negligible temperature differences. In an example, a maximum difference of 0.48 degrees was observed for the average hotspot temperature metric on surfaces not affected by sunlight and therefore average hotspot temperature differences at or below a difference of 0.48 Kelvin (a difference of 0.86 degrees Fahrenheit) may be considered negligible. Accuracy may be assessed when the values of the K-means approach are closest to the values from the TBC, as temperature values in the latter were extracted directly from each pixel and are taken to be the ground truth.

To obtain U-value for these buildings, the Stephen-Boltzmann constant σ was replaced by $5.67 \times 10_{-8}$ $Wm^{-2}K^{-4}$ in Equation (5) in addition to the spectrum emissivities mentioned earlier. Thermocouple temperatures may be obtained from the building surface through temperature data loggers, which may include conductive probes to measure surface temperatures. The probes may be secured to the indoor and outdoor surfaces using electrical tape for average durations of 20-30 seconds to obtain steady readings of the surface measured. Different points on the surface were used, and average values may be taken when the temperature readings did not differ too greatly from one another within a selected time frame.

The type of building surface or object may affect its temperature estimation. In an example, single-pane window U-values may be consistently higher than more than double-pane window U-values, which is consistent with double-pane windows consists of an extra layer of insulating air. As there are many factors that influence U-value estimation, the estimation is improved with further data collection and characterization of building surface or object, such as collecting data related to varying time frames, precise indoor temperature readings, varied building types, and other data.

The present solutions may consider and compensate for various factors that would otherwise contribute to uncertainties in thermal data capture and processing. In an example, the present solution includes three primary layers: (1) collection of data and instance segmentation using deep learning; (2) clustering and hotspot detection; and (3) U-value estimation. These three layers may be selected or modified to reduce or eliminate uncertainties in thermal data capture and processing.

To reduce or eliminate uncertainties associated with image capture, the capture time may be planned to reduce or eliminate effects of solar irradiance on readings from the imaging apparatus. Sunlight reflecting on external surfaces will radiate more heat than if the surfaces were shaded from the sunlight. This is especially true for high emissivity surfaces such as brick. Additionally, sunlight may still affect the surface for hours after the surface is shaded. This may be mitigated by using images obtained before sunrise and after sunset. Surrounding thermally reflective objects (e.g., metallic surfaces) may reflect high temperatures, leading to inaccurate surface measurements due to reflecting sunlight. This may be mitigated by identifying which buildings may have nearby reflective surfaces, such as buildings that are adjacent to parking lots that may include a significant number of vehicles with reflective surfaces. Atmospheric factors (e.g., heat and humidity) may influence temperature readings. In regions where the temperatures and relative humidity fluctuate quite frequently, measurements may be recorded systematically when there is acceptable consistency in weather patterns for a given day or time.

Uncertainties associated with object detection and instance segmentation may be reduced or eliminated based on configuring or training the deep learning models. Uncertainty in deep learning may be classified into two types: epistemic uncertainty and aleatory uncertainty. Epistemic uncertainty may refer to uncertainty associated with the objects that the model does not know because the training data was not appropriate. This type of uncertainty arises due to gaps in data and knowledge. This uncertainty may be reduced or eliminated by generating sufficient data, as this results in decreasing epistemic uncertainty. The aleatory uncertainty refers to the type of uncertainty rising from the stochasticity of the observations, which is more difficult to mitigate. There may be some uncertainty associated with reading of the data associated with U-value calculation, which may result in some variability the readings and the overall U-value estimation.

The use of K-means and TBC clustering may reduce or eliminate uncertainties associated with clustering and hotspot detection. The clustering and hotspot detection may be related to object detection and instance segmentation, and uncertainty associated with deep learning will propagate and create uncertainties associated with these steps. Additional clustering or hotspot detection sources may exist, such as the observation errors, background knowledge errors, induction principle errors, the selected induction principle learning algorithm, or other error sources. Similarly, the use of K-means and TBC clustering may reduce or eliminate uncertainties associated with U-value estimation. The formulas used for U-values are approximations and depend on many factors that are themselves subject to different types of uncertainties, which may be mitigated by the selected clustering method.

To further reduce or eliminate uncertainties, an accuracy metric may be calculated based on a percentage difference between empirical observations and true values (e.g., values provided by American Society of Heating, Refrigerating and Air-Conditioning Engineers (ASHRAE)). These true values may include values obtained by ASHRAE, which may include systematic or random uncertainties and may not reflect absolute values for the measurand that is devoid of any contributing or biasing factors. An average deviation $\Delta U_{avg}$ may be calculated using the following formula:

$$\Delta U_{avg} = \sum_{i=1}^{3} \frac{|U_i - U_c|}{3} \tag{15}$$

where Ui represents the U-values 1, 2, and 3. The precision is calculated using the following formula:

$$\text{Precision} = \frac{\Delta U_{avg}}{U_c} \times 100\% \tag{16}$$

In an example, average deviation for windows may be equal to or higher than average deviation of walls. This indicates the variation of U-values from their respective average value (Uc) for a given object may be lower for walls than for windows. The U-value measurements for walls may be more accurate and given more weight than U-values for windows. In an example, U-values obtained for the windows may be closer to the ASHRAE true values. This indicates U-values closer to one another may not necessarily indicate higher accuracies. Using the solutions described herein, the measured values for walls may be understood to be more precise (increased precision) but less accurate (increased errors).

Figure 9:
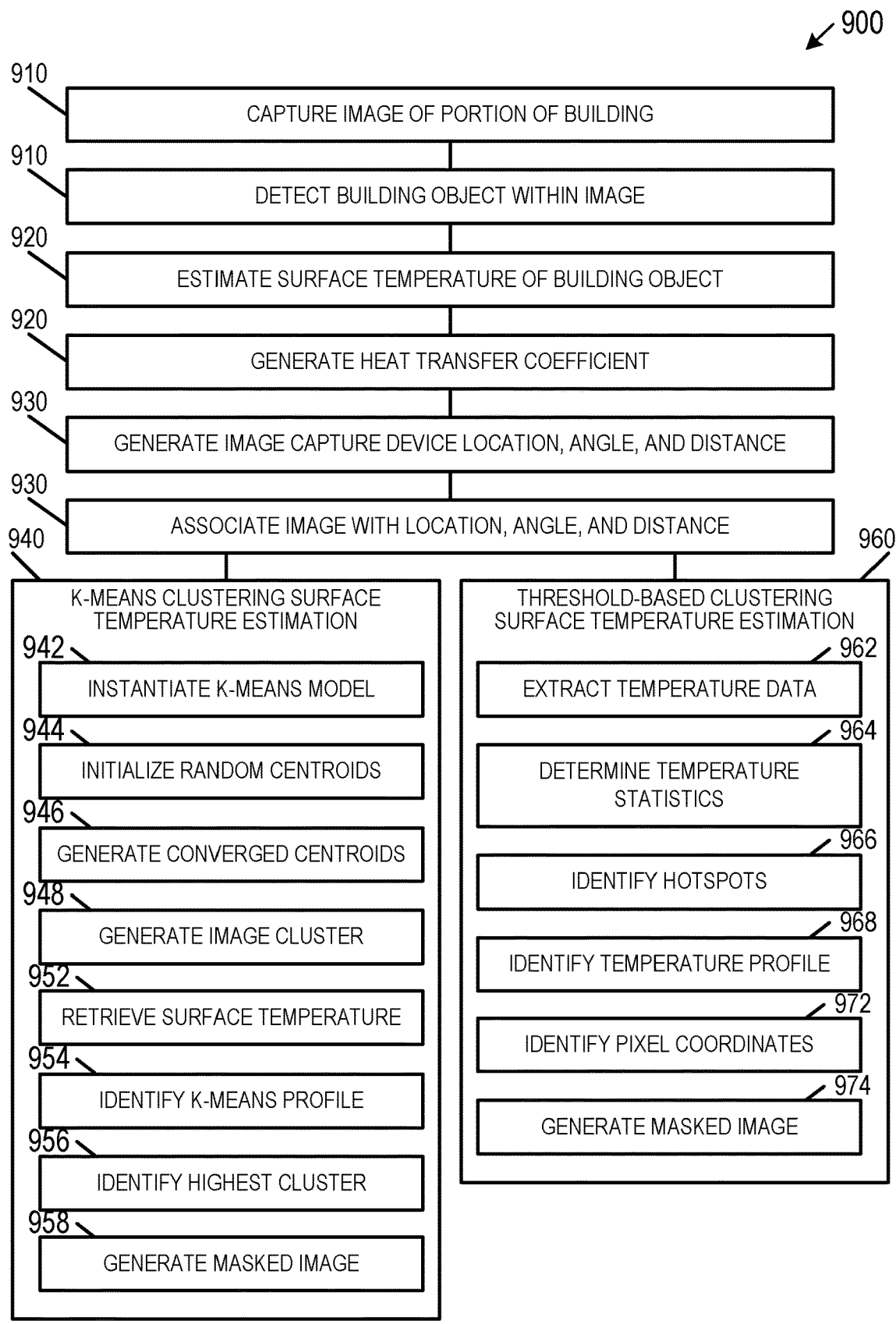
FIG. 9 is a diagram of a building heat loss quantification method, in accordance with at least one embodiment.

FIG. 9 is a diagram of a building heat loss quantification method 900, in accordance with at least one embodiment. Method 900 includes capturing 910 an image of a portion of a building at an image capture device, detecting 915 a building object within the image, estimating 920 a surface temperature of the building object, and generating 925 a heat transfer coefficient associated with the portion of the building based on the surface temperature. Method 900 may include generating 930, at an unmanned aerial vehicle, a known image capture device location, an image capture angle, and a camera-building distance, and associating 935 the image with the known image capture device location, the image capture angle, and the camera-building distance. The generation of the heat transfer coefficient may further be based on at least one of the known image capture device location, the image capture angle, and the camera-building distance. The estimation of the surface temperature of the building object may further be based on at least one of a building wall height, a building object elevation, and a plurality of average temperature difference observations. In an example, the building object may be detected based on an object detection convolutional neural network (CNN). The object detection CNN may include at least one of a mask region-based CNN (Mask R-CNN) and a Faster Region-of-Interest Pooling R-CNN (Faster R-CNN).

Method 900 may include estimating the surface temperature of the building object based on a K-means clustering method 940. In the K-means clustering method 940, the detection of the building object within the image may include instantiating 942 a K-means model, initializing 944 a plurality of random centroids, generating 946 a plurality of converged centroids based on a minimum Euclidian distance between pixels within each of the plurality of random centroids, and generating 948 an image cluster based on the plurality of converged centroids, the image cluster including the building object. In the K-means clustering method 940, the estimation of the surface temperature of the building object may include retrieving 952 a plurality of surface temperature data from the one or more storage devices, identifying 954 a K-means temperature profile associated with the image cluster based on the plurality of surface temperature data, identifying 956 a highest average cluster based on the temperature profile, and generating 958 a K-means output masked image based on the highest average cluster.

Method 900 may include estimating the surface temperature of the building object based on a threshold-based clustering (TBC) method 960. The TBC method 960 includes extracting 962 a plurality of temperature data from the image, determining 964 a plurality of temperature statistics associated with the plurality of temperature data, identifying 966 a plurality of hotspots based on the plurality of temperature statistics, identifying 968 a threshold clustering temperature profile associated with the plurality of hotspots, identifying 972 a plurality of pixel coordinates for pixel masking, and generating 974 a threshold clustering output masked image based on the plurality of pixel coordinates.

Figure 10:
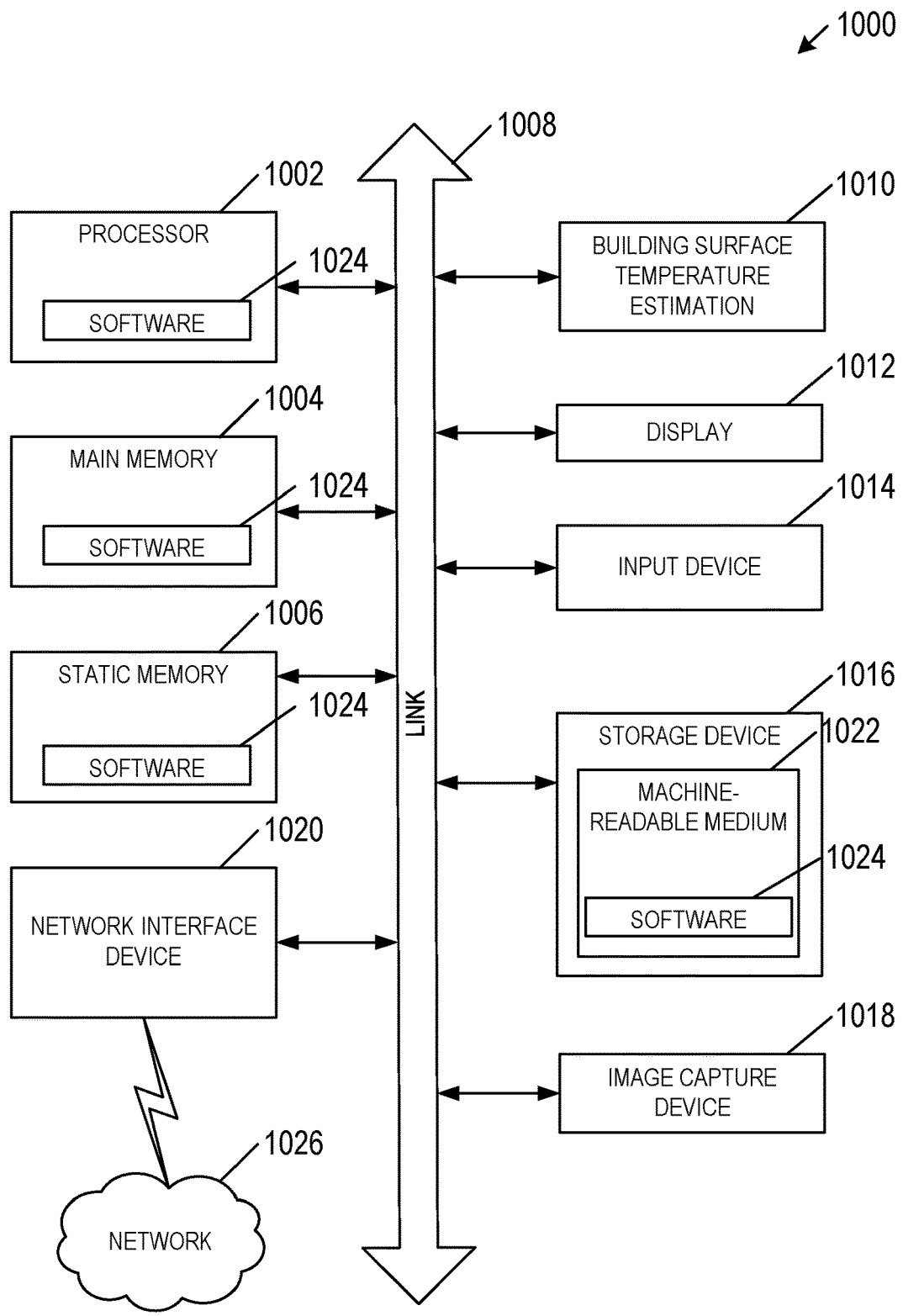
FIG. 10 is a block diagram illustrating a building object detection and mitigation system in an example form of an electronic device, within which a set or sequence of instructions may be executed to cause the machine to perform any one of the methodologies discussed herein, according to an example embodiment.

FIG. 10 is a block diagram illustrating a building object detection and mitigation system in an example form of an electronic device 1000, within which a set or sequence of instructions may be executed to cause the machine to perform any one of the methodologies discussed herein, according to an example embodiment. Electronic device 1000 may represent a single device or a system of multiple devices combined to provide building object detection and mitigation. In alternative embodiments, the electronic device 1000 operates as a standalone device or may be connected (e.g., networked) to other machines. In a networked deployment, the electronic device 1000 may operate in the capacity of either a server or a client machine in server-client network environments, or it may act as a peer machine in peer-to-peer (or distributed) network environments. The electronic device 1000 may be implemented on a System-on-a-Chip (SoC), a System-in-a-Package (SiP), an integrated circuit (IC), a portable electronic device, a personal computer (PC), a tablet PC, a hybrid tablet, a personal digital assistant (PDA), a mobile telephone, a server computer, or any electronic device 1000 capable of executing instructions (sequential or otherwise) that specify actions to be taken by that machine to detect a user input. Further, while only a single electronic device 1000 is illustrated, the terms "machine" or "electronic device" shall also be taken to include any collection of machines or devices that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to execute instructions, individually or jointly, to perform any one or more of the methodologies discussed herein.

Example electronic device 1000 includes at least one processor 1002 (e.g., a central processing unit (CPU), a graphics processing unit (GPU) or both, processor cores, compute nodes, etc.), a main memory 1004 and a static memory 1006, which communicate with each other via a link 1008 (e.g., bus). The main memory 1004 or static memory 1006 may be used to store navigation data (e.g., predetermined waypoints) or payload data (e.g., stored captured images).

The electronic device 1000 may include one or more building object detection components 1010, which may provide various building object detection data to perform the detection and mitigation processes described above. The building object detection components 1010 may include an autonomous vehicle signal RF signal receiver, an input device to read plaintext autonomous vehicle signal data, or other device to receive the autonomous vehicle signal data set. The building object detection components 1010 may include processing specific to building object detection, such as a GPU dedicated to machine learning. In an embodiment, certain building object detection processing may be performed by one or both of the processor 1002 and the building object detection components 1010. Certain building object detection processing may be performed only by the building object detection components 1010, such as machine learning training or evaluation performed on a GPU dedicated to machine learning.

The electronic device 1000 may further include a display unit 1012, where the display unit 1012 may include a single component that provides a user-readable display and a protective layer, or another display type. The electronic device 1000 may further include an input device 1014, such as a pushbutton, a keyboard, or a user interface (UI) navigation device (e.g., a mouse or touch-sensitive input). The electronic device 1000 may additionally include a storage device 1016, such as a drive unit. The electronic device 1000 may additionally include one or more image capture devices 1018 to capture images with different fields of view as described above. The electronic device 1000 may additionally include a network interface device 1020, and one or more additional sensors (not shown).

The storage device 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004, static memory 1006, or within the processor 1002 during execution thereof by the electronic device 1000. The main memory 1004, static memory 1006, and the processor 1002 may also constitute machine-readable media.

While the machine-readable medium 1022 is illustrated in an example embodiment to be a single medium, the term "machine-readable medium" may include a single medium or multiple media (e.g., a centralized or distributed database, and/or associated caches and servers) that store the one or more instructions 1024. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1024 may further be transmitted or received over a communications network 1026 using a transmission medium via the network interface device 1020 utilizing any one of a number of well-known transfer protocols (e.g., HTTP). Examples of communication networks include a local area network (LAN), a wide area network (WAN), the Internet, mobile telephone networks, and wireless data networks (e.g., Wi-Fi, NFC, Bluetooth, Bluetooth LE, 3G, 5G LTE/LTE-A, WiMAX networks, etc.). The communication networks may operate in any frequency band, such as bands allowed under a remote pilot license under Part 107 of the Federal Aviation Regulations.

The term "transmission medium" shall be taken to include any intangible medium that is capable of storing, encoding, or carrying instructions for execution by the machine, and includes digital or analog communications signals or other intangible medium to facilitate communication of such software. The communications network 1026 may be used to transmit unencrypted or encrypted captured data from a remote capture device (e.g., UAS) to a local dedicated server, to a cloud data services provider, or to another server or computing device.

To better illustrate the method and apparatuses disclosed herein, a non-limiting list of embodiments is provided here.

Example 1 is a system for building heat loss quantification, the system comprising: an image capture device to capture an image of a portion of a building; processing circuitry; and one or more storage devices comprising instructions, which when executed by the processing circuitry, configure the processing circuitry to: detect a building object within the image; estimate a surface temperature of the building object; and generate a heat transfer coefficient associated with the portion of the building based on the surface temperature.

In Example 2, the subject matter of Example 1 includes, an unmanned aerial vehicle to: generate a known image capture device location, an image capture angle, and a camera-building distance; and associate the image with the known image capture device location, the image capture angle, and the camera-building distance; wherein the generation of the heat transfer coefficient is further based on at least one of the known image capture device location, the image capture angle, and the camera-building distance.

In Example 3, the subject matter of Example 2 includes, wherein the estimation of the surface temperature of the building object is further based on at least one of a building wall height, a building object elevation, and a plurality of average temperature difference observations.

In Example 4, the subject matter of Examples 1-3 includes, wherein the building object is detected based on an object detection convolutional neural network (CNN).

In Example 5, the subject matter of Example 4 includes, wherein the object detection CNN includes at least one of a mask region-based CNN (Mask R-CNN) and a Faster Region-of-Interest Pooling R-CNN (Faster R-CNN).

In Example 6, the subject matter of Examples 1-5 includes, wherein the surface temperature of the building object is estimated based a K-means clustering method.

In Example 7, the subject matter of Example 6 includes, wherein the detection of the building object within the image includes: instantiating a K-means model; initializing a plurality of random centroids; generating a plurality of converged centroids based on a minimum Euclidian distance between pixels within each of the plurality of random centroids; and generating an image cluster based on the plurality of converged centroids, the image cluster including the building object.

In Example 8, the subject matter of Example 7 includes, wherein the estimation of the surface temperature of the building object includes: retrieving a plurality of surface temperature data from the one or more storage devices; identifying a K-means temperature profile associated with the image cluster based on the plurality of surface temperature data; identifying a highest average cluster based on the K-means temperature profile; and generating a K-means output masked image based on the highest average cluster.

In Example 9, the subject matter of Examples 1-8 includes, wherein the surface temperature of the building object is estimated based on a threshold-based clustering (TBC) method.

In Example 10, the subject matter of Example 9 includes, wherein the estimation of the surface temperature of the building object includes: extracting a plurality of temperature data from the image; determining a plurality of temperature statistics associated with the plurality of temperature data; identifying a plurality of hotspots based on the plurality of temperature statistics; identifying a threshold clustering temperature profile associated with the plurality of hotspots; identifying a plurality of pixel coordinates for pixel masking; and generating a threshold clustering output masked image based on the plurality of pixel coordinates.

Example 11 is a method for building heat loss quantification, the method comprising: capturing an image of a portion of a building at an image capture device; detecting a building object within the image; estimating a surface temperature of the building object; and generating a heat transfer coefficient associated with the portion of the building based on the surface temperature.

In Example 12, the subject matter of Example 11 includes, generating, at an unmanned aerial vehicle, a known image capture device location, an image capture angle, and a camera-building distance; and associating the image with the known image capture device location, the image capture angle, and the camera-building distance; wherein the generation of the heat transfer coefficient is further based on at least one of the known image capture device location, the image capture angle, and the camera-building distance.

In Example 13, the subject matter of Example 12 includes, wherein the estimation of the surface temperature of the building object is further based on at least one of a building wall height, a building object elevation, and a plurality of average temperature difference observations.

In Example 14, the subject matter of Examples 11-13 includes, wherein the building object is detected based on an object detection convolutional neural network (CNN).

In Example 15, the subject matter of Example 14 includes, wherein the object detection CNN includes at least one of a mask region-based CNN (Mask R-CNN) and a Faster Region-of-Interest Pooling R-CNN (Faster R-CNN).

In Example 16, the subject matter of Examples 11-15 includes, wherein the surface temperature of the building object is estimated based a K-means clustering method.

In Example 17, the subject matter of Example 16 includes, wherein the detection of the building object within the image includes: instantiating a K-means model; initializing a plurality of random centroids; generating a plurality of converged centroids based on a minimum Euclidian distance between pixels within each of the plurality of random centroids; and generating an image cluster based on the plurality of converged centroids, the image cluster including the building object.

In Example 18, the subject matter of Example 17 includes, wherein the estimation of the surface temperature of the building object includes: retrieving a plurality of surface temperature data; identifying a K-means temperature profile associated with the image cluster based on the plurality of surface temperature data; identifying a highest average cluster based on the K-means temperature profile; and generating a K-means output masked image based on the highest average cluster.

In Example 19, the subject matter of Examples 11-18 includes, wherein the surface temperature of the building object is estimated based on a threshold-based clustering (TBC) method.

In Example 20, the subject matter of Example 19 includes, wherein the estimation of the surface temperature of the building object includes: extracting a plurality of temperature data from the image; determining a plurality of temperature statistics associated with the plurality of temperature data; identifying a plurality of hotspots based on the plurality of temperature statistics; identifying a threshold clustering temperature profile associated with the plurality of hotspots; identifying a plurality of pixel coordinates for pixel masking; and generating a threshold clustering output masked image based on the plurality of pixel coordinates.

Example 21 is at least one non-transitory machine-readable storage medium, comprising a plurality of instructions that, responsive to being executed with processor circuitry of a computer-controlled device, cause the computer-controlled device to: capture an image of a portion of a building at an image capture device; detect a building object within the image; estimate a surface temperature of the building object; and generate a heat transfer coefficient associated with the portion of the building based on the surface temperature.

In Example 22, the subject matter of Example 21 includes, the instructions further causing the computer-controlled device to: generate, at an unmanned aerial vehicle, a known image capture device location, an image capture angle, and a camera-building distance; and associate the image with the known image capture device location, the image capture angle, and the camera-building distance; wherein the generation of the heat transfer coefficient is further based on at least one of the known image capture device location, the image capture angle, and the camera-building distance.

In Example 23, the subject matter of Example 22 includes, wherein the estimation of the surface temperature of the building object is further based on at least one of a building wall height, a building object elevation, and a plurality of average temperature difference observations.

In Example 24, the subject matter of Examples 21-23 includes, wherein the building object is detected based on an object detection convolutional neural network (CNN).

In Example 25, the subject matter of Example 24 includes, wherein the object detection CNN includes at least one of a mask region-based CNN (Mask R-CNN) and a Faster Region-of-Interest Pooling R-CNN (Faster R-CNN).

In Example 26, the subject matter of Examples 21-25 includes, wherein the surface temperature of the building object is estimated based a K-means clustering method.

In Example 27, the subject matter of Example 26 includes, wherein the detection of the building object within the image instructions further causing the computer-controlled device to: instantiate a K-means model; initialize a plurality of random centroids; generate a plurality of converged centroids based on a minimum Euclidian distance between pixels within each of the plurality of random centroids; and generate an image cluster based on the plurality of converged centroids, the image cluster including the building object.

In Example 28, the subject matter of Example 27 includes, wherein the estimation of the surface temperature of the building object instructions further causing the computer-controlled device to: retrieve a plurality of surface temperature data; identify a K-means temperature profile associated with the image cluster based on the plurality of surface temperature data; identify a highest average cluster based on the K-means temperature profile; and generate a K-means output masked image based on the highest average cluster.

In Example 29, the subject matter of Examples 21-28 includes, wherein the surface temperature of the building object is estimated based on a threshold-based clustering (TBC) method.

In Example 30, the subject matter of Example 29 includes, wherein the estimation of the surface temperature of the building object instructions further causing the computer-controlled device to: extract a plurality of temperature data from the image; determine a plurality of temperature statistics associated with the plurality of temperature data; identify a plurality of hotspots based on the plurality of temperature statistics; identify a threshold clustering temperature profile associated with the plurality of hotspots; identify a plurality of pixel coordinates for pixel masking; and generate a threshold clustering output masked image based on the plurality of pixel coordinates.

Example 31 is at least one machine-readable medium including instructions that, when executed by processing circuitry, cause the processing circuitry to perform operations to implement of any of Examples 1-30.

Example 32 is an apparatus comprising means to implement of any of Examples 1-30.

Example 33 is a system to implement of any of Examples 1-30.

Example 34 is a method to implement of any of Examples 1-30.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. In the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments may be combined with each other in various combinations or permutations. The scope should be determined with reference to the appended claims, along with the full scope of equivalents to which such claims are entitled.

What is claimed is:

1. A system for building heat loss quantification, the system comprising:
   an unmanned aerial vehicle including an image capture device to capture an image of a portion of a building, estimate a building wall height and a building object elevation, and associate the image with the building wall height and the building object elevation;
   processing circuitry; and
   one or more storage devices comprising instructions, which when executed by the processing circuitry, configure the processing circuitry to:
   detect a building object within the image;
   estimate a surface temperature of the building object based on the building wall height and the building object elevation; and
   generate a heat transfer coefficient associated with the portion of the building based on the surface temperature.

2. The system of claim 1, the unmanned aerial vehicle further to:
   generate a known image capture device location, an image capture angle, and a camera-building distance; and
   associate the image with the known image capture device location, the image capture angle, and the camera-building distance;
   wherein the generation of the heat transfer coefficient is further based on at least one of the known image capture device location, the image capture angle, and the camera-building distance.

3. The system of claim 1, wherein the surface temperature of the building object is estimated based a K-means clustering method.

4. The system of claim 3, wherein the detection of the building object within the image includes:
   instantiating a K-means model;
   initializing a plurality of random centroids;
   generating a plurality of converged centroids based on a minimum Euclidian distance between pixels within each of the plurality of random centroids; and
   generating an image cluster based on the plurality of converged centroids, the image cluster including the building object.

5. The system of claim 4, wherein the estimation of the surface temperature of the building object includes:
   retrieving a plurality of surface temperature data from the one or more storage devices;
   identifying a K-means temperature profile associated with the image cluster based on the plurality of surface temperature data;
   identifying a highest average cluster based on the K-means temperature profile; and
   generating a K-means output masked image based on the highest average cluster.

6. The system of claim 1, wherein the surface temperature of the building object is estimated based on a threshold-based clustering (TBC) method.

7. The system of claim 6, wherein the estimation of the surface temperature of the building object includes:
   extracting a plurality of temperature data from the image;
   determining a plurality of temperature statistics associated with the plurality of temperature data;
   identifying a plurality of hotspots based on the plurality of temperature statistics;
   identifying a threshold clustering temperature profile associated with the plurality of hotspots;
   identifying a plurality of pixel coordinates for pixel masking; and
   generating a threshold clustering output masked image based on the plurality of pixel coordinates.

8. A method for building heat loss quantification, the method comprising:
   capturing an image of a portion of a building at an image capture device;
   detecting a building object within the image;
   estimating a building wall height and a building object elevation associated with the building object;
   estimating a surface temperature of the building object based on the building wall height and the building object elevation; and
   generating a heat transfer coefficient associated with the portion of the building based on the surface temperature.

9. The method of claim 8, further including:
   generating, at an unmanned aerial vehicle, a known image capture device location, an image capture angle, and a camera-building distance; and
   associating the image with the known image capture device location, the image capture angle, and the camera-building distance;
   wherein the generation of the heat transfer coefficient is further based on at least one of the known image capture device location, the image capture angle, and the camera-building distance.

10. The method of claim 8, wherein the surface temperature of the building object is estimated based a K-means clustering method.

11. The method of claim 10, wherein the detection of the building object within the image includes:
instantiating a K-means model;
initializing a plurality of random centroids;
generating a plurality of converged centroids based on a minimum Euclidian distance between pixels within each of the plurality of random centroids; and
generating an image cluster based on the plurality of converged centroids, the image cluster including the building object.

12. The method of claim 11, wherein the estimation of the surface temperature of the building object includes:
retrieving a plurality of surface temperature data;
identifying a K-means temperature profile associated with the image cluster based on the plurality of surface temperature data;
identifying a highest average cluster based on the K-means temperature profile; and
generating a K-means output masked image based on the highest average cluster.

13. The method of claim 8, wherein the surface temperature of the building object is estimated based on a threshold-based clustering (TBC) method.

14. The method of claim 13, wherein the estimation of the surface temperature of the building object includes:
extracting a plurality of temperature data from the image;
determining a plurality of temperature statistics associated with the plurality of temperature data;
identifying a plurality of hotspots based on the plurality of temperature statistics;
identifying a threshold clustering temperature profile associated with the plurality of hotspots;
identifying a plurality of pixel coordinates for pixel masking; and
generating a threshold clustering output masked image based on the plurality of pixel coordinates.

15. At least one non-transitory machine-readable storage medium, comprising a plurality of instructions that, responsive to being executed with processor circuitry of a computer-controlled device, cause the computer-controlled device to:
capture an image of a portion of a building at an image capture device;
detect a building object within the image;
estimate a building wall height and a building object elevation associated with the building object;
estimate a surface temperature of the building object based on the building wall height and the building object elevation; and
generate a heat transfer coefficient associated with the portion of the building based on the surface temperature.

16. The non-transitory machine-readable storage medium of claim 15, the instructions further causing the computer-controlled device to:
generate, at an unmanned aerial vehicle, a known image capture device location, an image capture angle, and a camera-building distance; and
associate the image with the known image capture device location, the image capture angle, and the camera-building distance;
wherein the generation of the heat transfer coefficient is further based on at least one of the known image capture device location, the image capture angle, and the camera-building distance.

17. The non-transitory machine-readable storage medium of claim 15, wherein the surface temperature of the building object is estimated based a K-means clustering method.

18. The non-transitory machine-readable storage medium of claim 17, wherein the detection of the building object within the image instructions further causing the computer-controlled device to:
instantiate a K-means model;
initialize a plurality of random centroids;
generate a plurality of converged centroids based on a minimum Euclidian distance between pixels within each of the plurality of random centroids; and
generate an image cluster based on the plurality of converged centroids, the image cluster including the building object.

* * * * *